United States Patent
Zhu et al.

(10) Patent No.: US 9,635,697 B2
(45) Date of Patent: Apr. 25, 2017

(54) USER EQUIPMENT PAIRING PROCESSING METHOD, NETWORK SIDE DEVICE, AND USER EQUIPMENT

(71) Applicant: HUAWEI TECHNOLOGIES CO., LTD., Shenzhen, Guangdong (CN)

(72) Inventors: Song Zhu, Beijing (CN); Yue Li, Shenzhen (CN); Xiaolong Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/072,872

(22) Filed: Mar. 17, 2016

(65) Prior Publication Data
US 2016/0198512 A1 Jul. 7, 2016

Related U.S. Application Data

(63) Continuation of application No. 14/622,142, filed on Feb. 13, 2015, now Pat. No. 9,320,070, which is a (Continued)

(51) Int. Cl.
*H04W 76/02* (2009.01)
*H04L 29/06* (2006.01)
(Continued)

(52) U.S. Cl.
CPC ....... *H04W 76/023* (2013.01); *H04L 63/0869* (2013.01); *H04W 4/008* (2013.01);
(Continued)

(58) Field of Classification Search
CPC ... H04W 76/023; H04W 4/008; H04W 12/06; H04W 24/10; H04W 76/021; H04L 63/0869
(Continued)

(56) References Cited

U.S. PATENT DOCUMENTS 5,335,278 A * 8/1994 Matchett .............. H04W 12/12
340/5.74
5,689,502 A * 11/1997 Scott .................... H04J 3/0682
370/281
(Continued)

FOREIGN PATENT DOCUMENTS

CN 101867965 10/2010
CN 102083138 A 6/2011
(Continued)

OTHER PUBLICATIONS

Supplemental Notice of Allowability, dated Feb. 16, 2016, in U.S. Appl. No. 14/622,142.
(Continued)

*Primary Examiner* — Hai V Nguyen
(74) *Attorney, Agent, or Firm* — Staas & Halsey LLP

(57) ABSTRACT

Embodiments of the present invention provide a user equipment pairing processing method, a network side device, and a user equipment. The method includes: acquiring, by a network side device, pairing request information of a beneficial user equipment and a candidate support user equipment that are to be paired; and implementing, by the network side device, pairing of the beneficial user equipment and the candidate support user equipment according to the pairing request information, and sending a pairing success message to the beneficial user equipment and the candidate support user equipment. In the technical solutions provided by the embodiments of the present invention, user pairing in cooperative communication is implemented.

10 Claims, 13 Drawing Sheets

A radio access network device sends a fourth pairing request message to a core network device, where the fourth pairing request message carries pairing request information of a beneficial user equipment and a candidate support user equipment, the pairing request information includes an identifier of the beneficial user equipment and an identifier of the candidate support user equipment, or the pairing request information includes an identifier of the beneficial user equipment, an identifier of the candidate support user equipment, and a common pairing identifier — 201

The radio access network device receives third pairing permission indication information, returned by the core network device, about pairing of the beneficial user equipment and the candidate support user equipment — 202

Related U.S. Application Data continuation of application No. PCT/CN2012/080314, filed on Aug. 17, 2012.

(51) Int. Cl.
  *H04W 12/06* (2009.01)
  *H04W 4/00* (2009.01)
  *H04W 24/10* (2009.01)

(52) U.S. Cl.
  CPC ........... *H04W 12/06* (2013.01); *H04W 24/10* (2013.01); *H04W 76/021* (2013.01)

(58) Field of Classification Search
  USPC .................................................. 455/41.2, 436
  See application file for complete search history.

(56) References Cited

U.S. PATENT DOCUMENTS

| | | | | |
|---|---|---|---|---|
| 5,745,484 A * | 4/1998 | Scott | ................... | H04B 1/7093 370/347 |
| 5,802,046 A * | 9/1998 | Scott | ................... | H04J 3/0682 370/280 |
| 5,959,980 A * | 9/1999 | Scott | ................... | H04B 7/2656 370/280 |
| 6,097,950 A * | 8/2000 | Bertacchi | ................ | H04W 8/12 455/432.2 |
| 6,920,121 B2 * | 7/2005 | Tan | ....................... | H04W 72/10 370/329 |
| 6,938,156 B2 * | 8/2005 | Wheeler | ................ | G06F 21/32 380/282 |
| 6,952,181 B2 * | 10/2005 | Karr | ..................... | G01C 21/206 342/450 |
| 6,954,442 B2 * | 10/2005 | Tsirtsis | ................... | H04L 29/06 370/328 |
| 6,968,153 B1 * | 11/2005 | Heinonen | ............. | H04W 88/04 370/338 |
| 6,970,445 B2 * | 11/2005 | O'Neill | ............. | H04L 29/12009 370/338 |
| 6,996,605 B2 * | 2/2006 | Low | ........................ | G06Q 30/06 709/203 |
| 7,185,362 B2 * | 2/2007 | Hawkes | .................. | G06F 21/10 380/201 |
| 7,310,525 B2 * | 12/2007 | Takase | ................ | H04L 63/0407 455/420 |
| 7,349,369 B2 * | 3/2008 | Tsirtsis | .................... | H04L 29/06 370/328 |
| 7,363,376 B2 * | 4/2008 | Uhlik | .................. | H04W 76/021 455/414.3 |
| 7,366,152 B2 * | 4/2008 | O'Neill | ............. | H04L 29/12009 370/338 |
| 7,366,534 B2 * | 4/2008 | Hong | ..................... | H04W 84/18 370/230 |
| 7,477,629 B2 * | 1/2009 | Tsirtsis | .............. | H04L 29/06027 370/338 |
| 7,558,529 B2 * | 7/2009 | Seshadri | ............. | H04M 1/6033 455/41.2 |
| 7,573,855 B2 * | 8/2009 | Hohl | ........................ | H04L 63/08 370/338 |
| 7,583,631 B2 * | 9/2009 | Tan | ....................... | H04W 72/10 370/329 |
| 7,602,918 B2 * | 10/2009 | Mizikovsky | .......... | H04L 63/061 380/255 |
| 7,680,120 B2 * | 3/2010 | Aizu | ..................... | H04L 29/06 370/352 |
| 7,697,936 B2 * | 4/2010 | Hosono | ................ | H04W 24/02 370/329 |
| 7,698,392 B2 * | 4/2010 | Zapata | ..................... | G06F 8/65 709/220 |
| 7,792,935 B2 * | 9/2010 | Karjanlahti | ........... | H04L 12/189 370/340 |
| 7,913,192 B2 * | 3/2011 | Dicke | ................ | G01C 21/3667 340/995.14 |
| 7,933,603 B2 * | 4/2011 | Kim | ..................... | H04W 48/16 370/328 |
| 7,965,983 B1 * | 6/2011 | Swan | .................. | H04L 63/0485 455/41.1 |
| 7,987,045 B2 * | 7/2011 | Bowman | .............. | G01C 21/367 340/995.14 |
| 8,015,253 B1 * | 9/2011 | Zapata | .................. | G06F 21/606 709/206 |
| 8,024,000 B2 * | 9/2011 | Wang | ...................... | H04W 8/20 455/411 |
| 8,045,921 B2 * | 10/2011 | Lee | ........................ | H04W 84/20 455/39 |
| 8,051,163 B2 * | 11/2011 | Ruiz | .................... | H04L 12/2697 709/223 |
| 8,079,068 B2 * | 12/2011 | Adams | .................. | H04W 12/06 380/270 |
| 8,103,247 B2 * | 1/2012 | Ananthanarayanan | ........................ | H04W 12/04 455/410 |
| 8,112,794 B2 * | 2/2012 | Little | .................. | H04L 63/0853 380/270 |
| 8,229,470 B1 * | 7/2012 | Ranjan | .................. | H04W 4/028 455/456.3 |
| 8,238,958 B2 * | 8/2012 | Bourlas | ................ | H04L 1/0003 455/522 |
| 8,244,459 B2 * | 8/2012 | Bowman | .............. | G01C 21/367 701/400 |
| 8,284,748 B2 * | 10/2012 | Borghei | ................ | H04W 4/021 370/252 |
| 8,340,711 B1 * | 12/2012 | Glass | ..................... | H04W 4/22 455/411 |
| 8,527,987 B2 * | 9/2013 | Johansson | ................ | G06F 8/61 455/41.1 |
| 8,595,366 B2 * | 11/2013 | Mukundan | .......... | H04L 49/1576 709/227 |
| 8,634,775 B2 * | 1/2014 | Oshiba | ............. | H04L 67/1095 455/41.2 |
| 8,650,292 B2 * | 2/2014 | Ruiz | .................... | H04L 12/2697 709/224 |
| 8,654,977 B2 * | 2/2014 | Lee | ........................ | G06F 21/606 380/270 |
| 8,656,067 B2 * | 2/2014 | Hanes | ................... | G06F 3/0231 710/15 |
| 8,666,313 B2 * | 3/2014 | Preston | ................... | H04L 63/18 370/310 |
| 8,676,995 B1 * | 3/2014 | Andreasen | ......... | H04N 21/4227 340/4.11 |
| 8,699,472 B2 * | 4/2014 | Faccinn | ................ | H04L 12/14 370/338 |
| 8,731,599 B2 * | 5/2014 | Wei | ........................ | H04B 7/0617 455/522 |
| 8,745,717 B2 * | 6/2014 | Adams | .................. | H04L 63/0853 380/270 |
| 8,787,572 B1 * | 7/2014 | Tewari | .................. | H04L 9/0841 370/401 |
| 8,787,575 B2 * | 7/2014 | Laaksonen | ............ | H04L 63/062 380/270 |
| 8,811,613 B2 * | 8/2014 | Teruyama | ............ | H04L 9/0841 380/255 |
| 8,811,910 B2 * | 8/2014 | Kim | ...................... | H04W 36/30 342/357.43 |
| 8,839,398 B2 * | 9/2014 | Adams | ................ | H04L 63/0853 380/270 |
| 8,850,031 B2 * | 9/2014 | Oshiba | .................. | H04M 1/7253 709/227 |
| 8,948,797 B2 * | 2/2015 | Mathias | ............... | H04M 7/0057 455/412.2 |
| 8,954,003 B2 * | 2/2015 | Chen | ........................ | H04B 5/00 370/310 |
| 8,954,076 B2 * | 2/2015 | Lim | ................ | H04W 72/0406 370/252 |
| 9,009,265 B2 * | 4/2015 | Zapata | ................ | H04L 43/0811 709/219 |
| 9,036,603 B2 * | 5/2015 | Johnsson | ................ | H04W 24/04 370/329 |
| 9,059,775 B2 * | 6/2015 | Qin | ....................... | H04W 12/06 |

(56) References Cited

U.S. PATENT DOCUMENTS

| | | | |
|---|---|---|---|
| 9,065,822 B2* | 6/2015 | Andersen | H04L 63/0853 |
| 9,100,320 B2* | 8/2015 | Hsy | H04L 43/14 |
| 9,100,849 B2* | 8/2015 | Wang | H04W 8/20 |
| 9,130,914 B2* | 9/2015 | Miura | G06F 21/445 |
| 9,143,548 B2* | 9/2015 | Foti | H04L 65/1016 |
| 9,320,070 B2* | 4/2016 | Zhu | H04L 63/0869 |
| 2002/0127995 A1 | 9/2002 | Faccinn | H04L 12/14 455/406 |
| 2003/0039361 A1* | 2/2003 | Hawkes | G06F 21/10 380/278 |
| 2003/0187926 A1* | 10/2003 | Karjanlahti | H04L 12/189 709/204 |
| 2004/0125811 A1* | 7/2004 | Raad | H04W 74/08 370/400 |
| 2004/0184426 A1* | 9/2004 | Tan | H04W 72/10 370/338 |
| 2005/0021940 A1* | 1/2005 | Ma | H04W 12/06 713/155 |
| 2005/0075135 A1* | 4/2005 | Cromer | H04W 12/06 455/558 |
| 2005/0208945 A1* | 9/2005 | Hong | H04W 36/0055 455/436 |
| 2005/0215233 A1* | 9/2005 | Perera | H04W 12/06 455/411 |
| 2005/0243744 A1* | 11/2005 | Tan | H04W 72/10 370/278 |
| 2006/0116117 A1* | 6/2006 | Takase | H04L 63/0407 455/420 |
| 2006/0126638 A1* | 6/2006 | Fuhs | H04L 12/56 370/395.7 |
| 2006/0148402 A1* | 7/2006 | Hagiwara | H04L 9/3271 455/41.1 |
| 2006/0251100 A1* | 11/2006 | Kim | H04W 48/16 370/432 |
| 2006/0252373 A1* | 11/2006 | Huh | H04B 1/715 455/41.2 |
| 2006/0267841 A1* | 11/2006 | Lee | G01S 5/0081 342/463 |
| 2007/0093267 A1* | 4/2007 | Hosono | H04W 16/10 455/561 |
| 2007/0093268 A1* | 4/2007 | Hosono | H04W 24/02 455/561 |
| 2007/0104180 A1* | 5/2007 | Aizu | H04L 29/06 370/352 |
| 2007/0116282 A1* | 5/2007 | Hawkes | G06F 21/10 380/239 |
| 2007/0229311 A1* | 10/2007 | Bowman | G01C 21/367 340/995.14 |
| 2007/0233385 A1* | 10/2007 | Dicke | G01C 21/3667 715/864 |
| 2007/0266148 A1* | 11/2007 | Ruiz | H04L 12/2697 709/224 |
| 2008/0011827 A1* | 1/2008 | Little | H04W 12/06 235/380 |
| 2008/0016368 A1* | 1/2008 | Adams | H04L 63/0853 713/183 |
| 2008/0016537 A1* | 1/2008 | Little | H04L 63/0853 725/81 |
| 2008/0039136 A1* | 2/2008 | Byun | H04W 99/00 455/557 |
| 2008/0090524 A1* | 4/2008 | Lee | H04W 84/20 455/41.2 |
| 2008/0092212 A1* | 4/2008 | Patel | H04L 12/66 726/3 |
| 2008/0102793 A1* | 5/2008 | Ananthanarayanan | H04W 12/04 455/411 |
| 2008/0104170 A1* | 5/2008 | Ananthanarayanan | H04L 67/06 709/204 |
| 2008/0167003 A1* | 7/2008 | Wang | H04W 8/20 455/411 |
| 2008/0254782 A1* | 10/2008 | Nakamata | H04W 92/14 455/418 |
| 2009/0006614 A1* | 1/2009 | Le | H04L 67/025 709/224 |
| 2009/0037515 A1* | 2/2009 | Zapata | H04L 43/0811 709/202 |
| 2009/0054065 A1* | 2/2009 | Voyer | H04W 36/0066 455/436 |
| 2009/0106055 A1* | 4/2009 | Demczuk | G06Q 10/02 705/5 |
| 2009/0125228 A1* | 5/2009 | Dicke | G01C 21/3438 701/533 |
| 2009/0258665 A1* | 10/2009 | Bourlas | H04L 1/0003 455/522 |
| 2010/0115515 A1* | 5/2010 | Drabant | G06Q 10/06 718/100 |
| 2010/0235621 A1* | 9/2010 | Winkler | H04L 63/0428 713/153 |
| 2010/0240312 A1 | 9/2010 | Peng et al. | |
| 2010/0262696 A1* | 10/2010 | Oshiba | H04M 1/7253 709/227 |
| 2010/0275253 A1* | 10/2010 | Hirano | H04W 60/005 726/9 |
| 2010/0278345 A1* | 11/2010 | Alsina | H04L 63/0492 380/283 |
| 2010/0303236 A1* | 12/2010 | Laaksonen | H04L 63/062 380/270 |
| 2011/0016321 A1* | 1/2011 | Sundaram | H04L 63/061 713/171 |
| 2011/0028091 A1* | 2/2011 | Higgins | H04L 63/0492 455/41.2 |
| 2011/0117907 A1* | 5/2011 | Hooli | H04W 72/02 455/422.1 |
| 2011/0167392 A1* | 7/2011 | Dicke | G01C 21/3667 715/864 |
| 2011/0225310 A1* | 9/2011 | Takahashi | G06F 21/10 709/228 |
| 2011/0255526 A1* | 10/2011 | Kaneko | H04B 7/022 370/338 |
| 2011/0258313 A1* | 10/2011 | Mallik | H04W 8/005 709/224 |
| 2011/0258434 A1* | 10/2011 | Qiu | H04L 9/006 713/153 |
| 2011/0275390 A1* | 11/2011 | Bowman | G01C 21/367 455/457 |
| 2011/0281523 A1* | 11/2011 | Oshiba | H04L 67/1095 455/41.2 |
| 2011/0306384 A1* | 12/2011 | Wei | H04B 7/0617 455/522 |
| 2012/0015605 A1* | 1/2012 | Sole | H04W 12/06 455/41.3 |
| 2012/0016983 A1* | 1/2012 | Ruiz | H04L 12/2697 709/224 |
| 2012/0057501 A1* | 3/2012 | Dwivedi | H04W 76/023 370/253 |
| 2012/0066495 A1* | 3/2012 | Hao | H04L 9/0827 713/168 |
| 2012/0117636 A1* | 5/2012 | Adams | H04W 12/06 726/9 |
| 2012/0117637 A1* | 5/2012 | Little | H04L 63/0853 726/9 |
| 2012/0129540 A1 | 5/2012 | Hakola et al. | |
| 2012/0174199 A1* | 7/2012 | Perrin | H04L 63/0823 726/6 |
| 2012/0203737 A1* | 8/2012 | Golos | G06F 17/30286 707/617 |
| 2012/0284354 A1* | 11/2012 | Mukundan | H04L 49/1576 709/208 |
| 2012/0322379 A1* | 12/2012 | Eun | H04M 1/7253 455/41.2 |
| 2013/0029596 A1* | 1/2013 | Preston | H04L 63/18 455/41.1 |
| 2013/0031275 A1* | 1/2013 | Hanes | G06F 3/0231 710/4 |
| 2013/0064187 A1* | 3/2013 | Patil | H04W 76/021 370/329 |

(56) References Cited

U.S. PATENT DOCUMENTS

| | | | | |
|---|---|---|---|---|
| 2013/0084823 | A1* | 4/2013 | Glass | H04W 4/22 455/404.1 |
| 2013/0102314 | A1* | 4/2013 | Koskela | H04W 36/0072 455/436 |
| 2013/0173778 | A1* | 7/2013 | Hsy | H04L 43/14 709/224 |
| 2013/0179583 | A1* | 7/2013 | Foti | H04L 65/1016 709/228 |
| 2013/0182668 | A1* | 7/2013 | Xu | H04W 74/0833 370/329 |
| 2013/0195026 | A1* | 8/2013 | Johnsson | H04W 72/0493 370/329 |
| 2013/0246577 | A1* | 9/2013 | Gonzales | H04L 65/4084 709/219 |
| 2013/0252550 | A1* | 9/2013 | Johnson | H04Q 9/00 455/41.2 |
| 2013/0252551 | A1* | 9/2013 | Johnson | H04Q 9/00 455/41.2 |
| 2013/0252552 | A1* | 9/2013 | Vitkus | H04Q 9/00 455/41.2 |
| 2013/0265884 | A1* | 10/2013 | Brombal | H04W 76/027 370/242 |
| 2013/0279482 | A1* | 10/2013 | Sundberg | H04W 72/0406 370/336 |
| 2013/0286980 | A1* | 10/2013 | Liao | H04W 72/042 370/329 |
| 2013/0294306 | A1* | 11/2013 | Borges | H04W 76/02 370/311 |
| 2013/0295954 | A1* | 11/2013 | Hamalainen | G01S 5/0289 455/456.1 |
| 2013/0311140 | A1* | 11/2013 | Schechter | H04L 67/34 702/188 |
| 2014/0036793 | A1* | 2/2014 | Johnsson | H04W 24/04 370/329 |
| 2014/0046664 | A1* | 2/2014 | Sarkar | H04W 12/06 704/246 |
| 2014/0059044 | A1* | 2/2014 | Baldwin | G06F 17/3053 707/723 |
| 2014/0098777 | A1* | 4/2014 | Lim | H04W 72/0413 370/329 |
| 2014/0162633 | A1* | 6/2014 | Hwang | H04W 76/023 455/426.1 |
| 2014/0162714 | A1* | 6/2014 | Kim | H04W 76/023 455/509 |
| 2014/0192782 | A1* | 7/2014 | Centonza | H04W 36/0005 370/331 |
| 2014/0297846 | A1* | 10/2014 | Hoja | H04L 43/10 709/224 |
| 2014/0308959 | A1* | 10/2014 | De Benedittis | H04W 36/0061 455/437 |
| 2014/0314009 | A1* | 10/2014 | Xiong | H04W 28/16 370/329 |
| 2014/0341109 | A1* | 11/2014 | Cartmell | H04L 45/308 370/328 |
| 2015/0087236 | A1* | 3/2015 | Eun | H04M 1/7253 455/41.2 |
| 2015/0124733 | A1* | 5/2015 | Lim | H04W 52/244 370/329 |
| 2015/0163026 | A1* | 6/2015 | Li | H04W 88/04 370/329 |
| 2015/0163834 | A1* | 6/2015 | Li | H04W 72/048 455/450 |
| 2015/0163837 | A1* | 6/2015 | Li | H04W 76/00 370/329 |
| 2015/0163843 | A1* | 6/2015 | Zhu | H04L 63/0869 455/41.2 |
| 2015/0230144 | A1* | 8/2015 | Wu | H04W 76/043 370/331 |
| 2015/0245270 | A1* | 8/2015 | Wu | H04W 36/22 370/331 |
| 2015/0334519 | A1* | 11/2015 | Gai | G06F 3/041 455/41.2 |
| 2015/0341805 | A1* | 11/2015 | Wang | H04W 8/20 370/254 |
| 2016/0198512 | A1* | 7/2016 | Zhu | H04L 63/0869 455/41.2 |

FOREIGN PATENT DOCUMENTS

| | | |
|---|---|---|
| CN | 102215585 | 10/2011 |
| CN | 102365897 A | 2/2012 |
| CN | 102438322 | 5/2012 |
| CN | 102469410 A | 5/2012 |
| CN | 102547871 A | 7/2012 |
| WO | WO2010067605 A1 | 6/2010 |

OTHER PUBLICATIONS

Notice of Allowance, dated Dec. 4, 2015, in U.S. Appl. No. 14/622,142.
International Search Report mailed May 23, 2013 for corresponding International Patent Application No. PCT/CN2012/080314.
U.S. Appl. No. 14/622,142, filed Feb. 13, 2015, Song Zhu et al., Huawei Technologies Co., Ltd.

* cited by examiner

USER EQUIPMENT PAIRING PROCESSING METHOD, NETWORK SIDE DEVICE, AND USER EQUIPMENT

CROSS REFERENCE

This application is a continuation of U.S. application Ser. No. 14/622,142, filed on Feb. 13, 2015, which is a continuation of International Application No. PCT/CN2012/080314, filed on Aug. 17, 2012. The aforementioned patent applications are hereby incorporated by reference in their entireties.

TECHNICAL FIELD

Embodiments of the present invention relate to the field of communications technologies, and in particular, to a user equipment pairing processing method, a network side device, and a user equipment.

BACKGROUND

With rapid development of mobile communications technologies, mobile communications systems of different radio access technologies emerge, and these mobile communications systems not only provide voice communication services, but also provide data communication services, so that users may use the data communication services provided by these mobile communication systems to upload and download various types of data. During a process of uploading and downloading various types of data, the reliability and/or throughput of data transmission of a user equipment may be lowered due to various factors, and some communication means need to be adopted to solve the problem.

The reliability and/or throughput of data transmission of the user equipment is generally improved through some enhanced communication means, for example, coordinated multipoint transmission (Coordinated Multipoint, CoMP for short) is adopted to improve the reliability of a user equipment at a cell edge, and a carrier aggregation (Carrier Aggregation, CA) is adopted to improve the throughput of a user; however, a current communication means is operated for a single user equipment, and once an environment of the user equipment deteriorates, the throughput and/or reliability of data transmission of the user equipment will decrease sharply.

To solve the foregoing problem, a new concept of cooperative communication is put forward. The cooperative communication refers to that under the control of a cellular network, user equipments use short-distance communications technologies, such as Wireless Fidelity (WiFi for short), zigbee, and Device-to-Device (D2D for short), to exchange received cellular data with each other, so as to further improve the throughput of the user equipments. However, in situations, especially when multiple user equipments exist, the prior art does not provide a solution of how to implement effective organization and coordination between the user equipments, so as to achieve mutual support for data transmission.

SUMMARY

Embodiments of the present invention provide a user equipment pairing processing method, a network side device, and a user equipment, to implement effective organization and coordination between user equipments so as to achieve mutual support for data transmission.

In an aspect, an embodiment of the present invention provides a user equipment pairing processing method, including:

acquiring, by a network side device, pairing request information of a beneficial user equipment and a candidate support user equipment that are to be paired, where the pairing request information includes an identifier of the beneficial user equipment and an identifier of the candidate support user equipment, or the pairing request information includes an identifier of the beneficial user equipment, an identifier of the candidate support user equipment, and a common pairing identifier; and implementing, by the network side device, pairing of the beneficial user equipment and the candidate support user equipment according to the pairing request information, and sending a pairing success message to the beneficial user equipment and the candidate support user equipment.

In an aspect, an embodiment of the present invention provides a user equipment pairing processing method, including:

sending, by a radio access network device, a fourth pairing request message to a core network device, where the fourth pairing request message carries pairing request information of a beneficial user equipment and the candidate support user equipment, the pairing request information includes an identifier of the beneficial user equipment and an identifier of the candidate support user equipment, or the pairing request information includes an identifier of the beneficial user equipment, an identifier of the candidate support user equipment, and a common pairing identifier; and receiving, by the radio access network device, third pairing permission indication information, returned by the core network device, about pairing of the beneficial user equipment and the candidate support user equipment.

In an aspect, an embodiment of the present invention provides a user equipment pairing processing method, including:

sending, by a beneficial user equipment, a request message for pairing to a network side device;

receiving, by the beneficial user equipment, a pairing permission indication message returned by the network side device; and implementing pairing of the beneficial user equipment and a candidate support user equipment corresponding to the pairing permission indication message, to carry out cooperative communication.

In an aspect, an embodiment of the present invention provides a user equipment pairing processing method, including:

receiving, by a candidate support user equipment, a pairing invite message that carries a first pairing identifier of a beneficial user equipment and is sent by the beneficial user equipment by using a short-distance radio communication resource;

after determining to implement pairing with the beneficial user equipment, sending, by the candidate support user equipment, a pairing success request message carrying the first pairing identifier to a network side device; and receiving, by the candidate support user equipment, a pairing permission indication message that carries a second pairing identifier and is sent by the network side device, where the second pairing identifier is allocated by the network side to the candidate support user equipment.

In an aspect, an embodiment of the present invention provides a user equipment pairing processing method, including:

receiving, by a candidate support user equipment, a measurement request message that carries a first pairing identifier of a beneficial user equipment and is sent by a radio access network device;

after implementing measurement, sending, by the candidate support user equipment, a measurement report message, where the measurement report message carries the first pairing identifier; and receiving, by the candidate support user equipment, a pairing permission indication message that carries a second pairing identifier and is sent by a network side device, where the second pairing identifier is allocated by the network side to the candidate support user equipment.

In another aspect, an embodiment of the present invention provides a network side device, including:

a first acquisition module, configured to acquire pairing request information of a beneficial user equipment and a candidate support user equipment that are to be paired, where the pairing request information includes an identifier of the beneficial user equipment and an identifier of the candidate support user equipment, or the pairing request information includes an identifier of the beneficial user equipment, an identifier of the candidate support user equipment, and a common pairing identifier; and a first pairing processing module, connected to the first acquisition module, and configured to implement pairing of the beneficial user equipment and the candidate support user equipment according to the pairing request information, and send a pairing success message to the beneficial user equipment and the candidate support user equipment.

In another aspect, an embodiment of the present invention provides a radio access network device, including:

a first pairing request sending module, configured to send a fourth pairing request message to a core network device, where the fourth pairing request message carries pairing request information of a beneficial user equipment and the candidate support user equipment, the pairing request information includes an identifier of the beneficial user equipment and an identifier of the candidate support user equipment, or the pairing request information includes an identifier of the beneficial user equipment, an identifier of the candidate support user equipment, and a common pairing identifier; and a first pairing indication receiving module, connected to the first pairing request sending module, and configured to receive third pairing permission indication information that is returned by the core network device and confirms permission of pairing of the beneficial user equipment and the candidate support user equipment.

In another aspect, an embodiment of the present invention provides a user equipment, including:

a second pairing request sending module, configured to send a request message for pairing to a network side device;

a second pairing indication receiving module, connected to the second pairing request sending module, and configured to receive a pairing permission indication message returned by the network side device; and a first service processing module, connected to the second pairing indication receiving module, and configured to implement cooperative communication with a candidate support user equipment corresponding to the pairing permission indication message.

In another aspect, an embodiment of the present invention provides a user equipment, including:

a pairing invite receiving module, configured to receive a pairing invite message that carries a first pairing identifier of a beneficial user equipment and is sent by the beneficial user equipment by using a short-distance resource;

a pairing success request sending module, connected to the pairing invite receiving module, and configured to, after determining to implement pairing with the beneficial user equipment, send a pairing success request message carrying the first pairing identifier to a network side device; and a second pairing identifier receiving module, connected to the pairing success request sending module, and configured to receive a pairing permission indication message that carries a second pairing identifier and is sent by the network side device, where the second pairing identifier is allocated by the network side to a candidate support user equipment.

In another aspect, an embodiment of the present invention provides a user equipment, including:

a measurement request receiving module, configured to receive a measurement request message that carries a first pairing identifier of a beneficial user equipment and is sent by a radio access network device;

a measurement report sending module, connected to the measurement request receiving module, and configured to, after implementing measurement, send a measurement report message, where the measurement report message carries the first pairing identifier; and a third pairing identifier receiving module, connected to the measurement report sending module, and configured to receive a pairing permission indication message that carries a second pairing identifier and is sent by a network side device, where the second pairing identifier is allocated by the network side to a candidate support user equipment.

The embodiments of the present invention provide a user equipment pairing processing method, a network side device, and a user equipment. First, the network side device acquires information of a beneficial user equipment and information of a support user equipment that are to be paired; then, the network side device permits pairing of the beneficial user equipment and the support user equipment, and notifies the beneficial user equipment and the support user equipment; and through the way of the network side device controlling a pairing between the user equipments, the support user equipment and the beneficial user equipment are determined, and it is effectively implemented that the support user equipment supports data transmission of the beneficial user equipment. Compared with a defect of the prior art that a solution of how to implement organization and coordination between the user equipments is not provided, with the technical solutions provided by the embodiments of the present invention, cooperative communication can be more effectively implemented.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
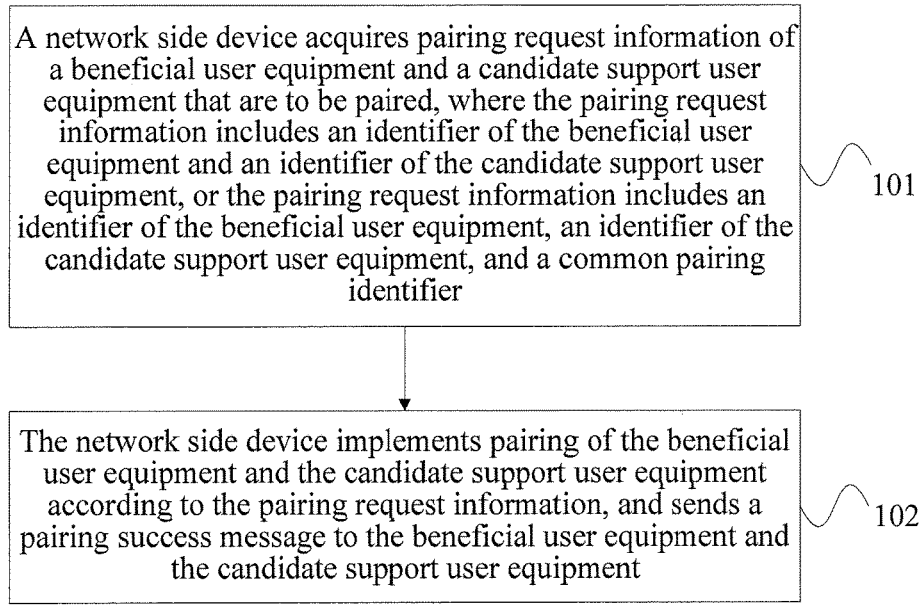
FIG. 1 is a flowchart of an embodiment of a user equipment pairing processing method provided by the present invention.

FIG. 1 is a flowchart of an embodiment of a user equipment pairing processing method provided by the present invention, and as shown in FIG. 1, the user equipment pairing processing method includes:

Step 101: A network side device acquires pairing request information of a beneficial user equipment and a candidate support user equipment that are to be paired, where the pairing request information includes an identifier of the beneficial user equipment and an identifier of the candidate support user equipment, or the pairing request information includes an identifier of the beneficial user equipment, an identifier of the candidate support user equipment, and a common pairing identifier; and the identifier of the user equipment in this embodiment may be an equipment identifier of the user equipment or a subscription identifier of the user equipment.

Step 102: The network side device implements pairing of the beneficial user equipment and the candidate support user equipment according to the pairing request information, and sends a pairing success message to the beneficial user equipment and the candidate support user equipment.

In the embodiment of the present invention, the network side device may be a core network device or a radio access network device, and specifically, the core network device may be an MME and the radio access network device may be an eNB. When the network side device acquires the pairing request information of the beneficial user equipment and the candidate support user equipment that are to be paired, specifically, the pairing request information may include the identifier of the beneficial user equipment and the identifier of the candidate support user equipment; or after the beneficial user equipment and the candidate support user equipment implement active pairing processing and generate a common pairing identifier, the pairing request information may further include the common pairing identifier of the beneficial user equipment and the candidate support user equipment.

Specifically, the pairing request information carries the identifier of the beneficial user equipment and the identifier of the candidate support user equipment, that is, the two user equipments to be paired may be easily determined according to the pairing request information, and that the network side device implements pairing of the beneficial user equipment and the candidate support user equipment according to the pairing request information in step 102 may include the following two situations:

When the network side device is a core network device, the core network device determines, according to the pairing request information, the beneficial user equipment and the candidate support user equipment to be paired, and determines, according to subscription information and/or terminal capability information of the beneficial user equipment and the candidate support user equipment, whether to permit pairing of the beneficial user equipment and the candidate support user equipment.

When the network side device is a radio access network device, the radio access network device determines, according to the pairing request information, the beneficial user equipment and the candidate support user equipment to be paired, and determines, according to any one or a combination of the following parameters, whether to permit pairing of the beneficial user equipment and the candidate support user equipment, where the parameters include:

a channel state parameter between the beneficial user equipment and the radio access network device, a channel state parameter between the candidate support user equipment and the radio access network device, a channel state parameter between the candidate support user equipment and the beneficial user equipment, and a network load parameter. In the technical solution provided by the embodiment of the present invention, that pairing is performed for two user equipments in cooperative communication is finally determined by the network side.

The embodiment of the present invention may be implemented in various manners, which specifically include the following situations:

1. Step 101 specifically includes: receiving, by the network side device, a first pairing request message sent by the beneficial user equipment, where the first pairing request message carries the identifier of the beneficial user equipment; allocating, by the network side device, a first pairing identifier to the beneficial user equipment, and sending the first pairing identifier to the beneficial user equipment; and receiving, by the network side device, a first pairing success request message sent by the candidate support user equipment, where the first pairing success request message carries the first pairing identifier allocated to the beneficial user equipment and the identifier of the candidate support user equipment. In this case, the network side device may be a core network device or a radio access network device.

In step 102, that the network side device sends a pairing success message to the beneficial user equipment and the candidate support user equipment may specifically include: sending a first pairing permission indication message to the beneficial user equipment and the candidate support user equipment, respectively.

Further, the network side device may allocate a second pairing identifier to the candidate support user equipment, and send the second pairing identifier to the beneficial user equipment and the candidate support user equipment, so as to implement pairing of the beneficial user equipment and the candidate support user equipment according to the first pairing identifier and the second pairing identifier, and carry out cooperative communication.

2. Step 101 may specifically include: receiving, by the network side device, a second pairing request message sent by the beneficial user equipment or the candidate support user equipment, where the second pairing request message carries the identifier of the beneficial user equipment, the identifier of the support user equipment, and a common third pairing identifier of the beneficial user equipment and the support user equipment;

or receiving, by the network side device, a third pairing request message sent by the beneficial user equipment and the candidate support user equipment, respectively, where the third pairing request message sent by the beneficial user equipment carries the identifier of the beneficial user equipment, and the common third pairing identifier of the beneficial user equipment and the candidate support user equipment; and the third pairing request message sent by the candidate support user equipment carries the identifier of the candidate support user equipment, and the common third pairing identifier of the beneficial user equipment and the candidate support user equipment.

In this situation, the beneficial user equipment and the candidate support user equipment implement pairing processing through active negotiation, generate a third pairing identifier, and send the second pairing request message or the third pairing request message to the network side device, where the network side device may also be a radio access network device or a core network device. The third pairing identifier may be a pairing identifier generated through negotiation of the beneficial user equipment and the candidate support user equipment, and may also be a pairing identifier allocated by the radio access network device or the core network device during the foregoing cooperative communication of the beneficial user equipment and the support user equipment.

In the embodiment, that the network side device sends a pairing success message to the beneficial user equipment and the candidate support user equipment in step 102 may specifically include: sending a second pairing permission indication message to the beneficial user equipment and the candidate support user equipment, respectively.

In the two situations, if the network side device is a core network device, after implementing pairing of the beneficial user equipment and the candidate support user equipment, the core network device further needs to send a pairing notification message to the radio access network device, where the pairing notification message carries the identifier of the beneficial user equipment, the first pairing identifier, the identifier of the candidate support user equipment, and the second pairing identifier; and after receiving the pairing notification message sent by the core network device, the radio access network device sends a notification message carrying a peer radio network temporary identifier to the beneficial user equipment and the candidate support user equipment, respectively, or sends a notification message carrying a newly allocated radio network temporary identifier to the beneficial user equipment and the candidate support user equipment, respectively.

Further, in the second situation, if the network side device is a radio access network device, after the sending a first pairing permission indication message or a second pairing permission indication message to the beneficial user equipment and the candidate support user equipment, respectively, the method further includes: sending, by the radio access network device, a notification message carrying a peer radio network temporary identifier to the beneficial user equipment and the candidate support user equipment, respectively, or sending a notification message carrying a newly allocated radio network temporary identifier to the beneficial user equipment and the candidate support user equipment, respectively.

3. When the network side device is a core network device, the radio access network device provides, for the core network device, the pairing request information of the beneficial user equipment and the candidate support user equipment that are to be paired, that is, step 101 in the embodiment specifically includes:

receiving, by the core network device, a fourth pairing request message sent by the radio access network device, and acquiring, by the core network device, from the fourth pairing request message, the pairing request information of the beneficial user equipment and the candidate support user equipment, that is, the fourth pairing request message carries the pairing request information of the beneficial user equipment and the support user equipment.

The sending a pairing success message to the beneficial user equipment and the candidate support user equipment in step 102 may specifically include:

returning, by the core network device, a third pairing permission indication message to the radio access network device, and notifying, by the radio access network device, the beneficial user equipment and the candidate support user equipment.

Further, in this situation, the core network device or the radio access network device allocates a first pairing identifier to the beneficial user equipment, allocates a second pairing identifier to the candidate support user equipment, and notifies the beneficial user equipment and the candidate support user equipment of the first pairing identifier and the second pairing identifier.

4. When the network side device is a radio access network device, step 101 may specifically include:

receiving, by the radio access network device, a fifth pairing request message sent by the beneficial user equipment or the candidate support user equipment, acquiring, by the radio access network device from the fifth pairing request message, a radio network temporary identifier of the beneficial user equipment and a radio network temporary identifier of the candidate support user equipment, or acquiring, by the radio access network device from the fifth pairing request message, a radio network temporary identifier and a radio bearer identifier of the beneficial user equipment, and a radio network temporary identifier and a radio bearer identifier of the candidate support user equipment; or receiving, by the radio access network device, a sixth pairing request message sent by the beneficial user equipment and the candidate support user equipment, respectively, acquiring, by the radio access network device from the sixth pairing request message sent by the beneficial user equipment, a radio network temporary identifier of the candidate support user equipment, and acquiring, from the sixth pairing request message sent by the candidate support user equipment, a radio network temporary identifier of the beneficial user equipment, or acquiring, by the radio access network device from the sixth pairing request message sent by the beneficial user equipment, a radio network temporary identifier and a radio bearer identifier of the support user equipment, and acquiring, from the sixth pairing request message sent by the candidate support user equipment, a radio network temporary identifier and a radio bearer identifier of the beneficial user equipment.

In this situation, when the beneficial user equipment and the support user equipment are in a connected state, the two user equipments implement pairing processing through active negotiation and exchange the radio network temporary identifiers, and on this basis, may further exchange the radio bearer identifiers; therefore, the radio network temporary identifiers of the two user equipments may be used as the identifiers of the two user equipments, and the beneficial user equipment or the candidate support user equipment requests, through the fifth pairing request message or the sixth pairing request message, pairing permission from the radio access network device.

Figure 2:
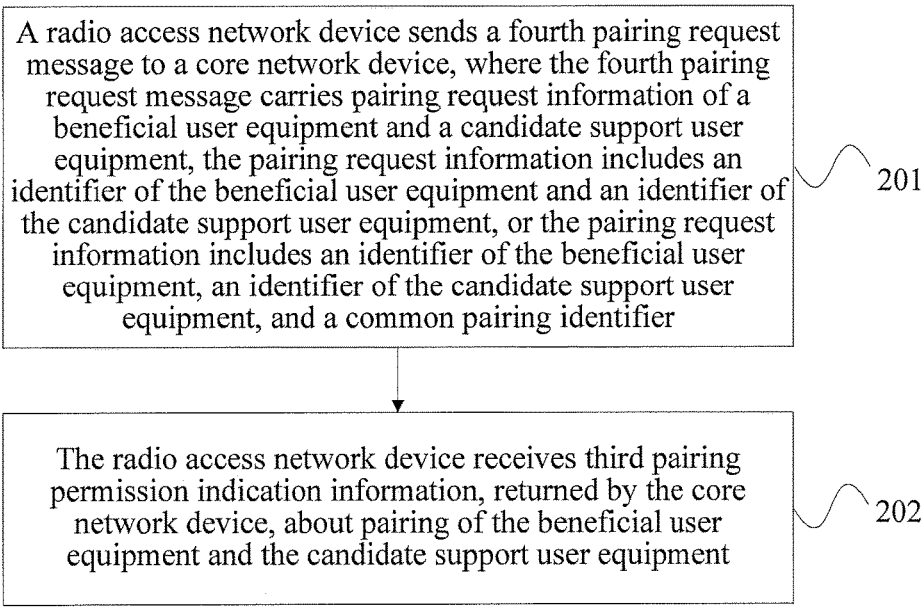
FIG. 2 is a flowchart of another embodiment of a user equipment pairing processing method provided by the present invention.

FIG. 2 is a flowchart of another embodiment of a user equipment pairing processing method provided by the present invention, this embodiment corresponds to the third situation in the embodiment shown in FIG. 1, and as shown in FIG. 2, the user equipment pairing processing method includes:

Step 201: A radio access network device sends a fourth pairing request message to a core network device, where the fourth pairing request message carries pairing request information of a beneficial user equipment and the candidate support user equipment, the pairing request information includes an identifier of the beneficial user equipment and an identifier of the candidate support user equipment, or the pairing request information includes an identifier of the beneficial user equipment, an identifier of the candidate support user equipment, and a common pairing identifier.

Step 202: The radio access network device receives third pairing permission indication information, returned by the core network device, about pairing of the beneficial user equipment and the candidate support user equipment.

The embodiment of the present invention may be implemented in various manners, which specifically include the following situations:

1. When the network side device is a radio access network device, in step 201, the fourth pairing request message carries the pairing request information of the beneficial user equipment and the candidate support user equipment. Before step 201, the method further includes: receiving, by the radio access network device, a seventh pairing request message sent by the beneficial user equipment, receiving a second pairing success request message sent by the candidate support user equipment, and acquiring, by the radio access network device according to the seventh pairing request message and the second pairing success request message, the pairing request information of the beneficial user equipment and the candidate support user equipment. Before the receiving a second pairing success request message sent by the candidate support user equipment, the method further includes: after confirming permission of pairing of the beneficial user equipment according to the identifier of the beneficial user equipment, acquiring, by the radio access network device, a first pairing identifier of the beneficial user equipment, and notifying the beneficial user equipment, where the second pairing success request message carries the first pairing identifier of the beneficial user equipment.

2. In step 201, the fourth pairing request message carries information of the beneficial user equipment and information of the support user equipment. Before step 201, the method further includes: receiving, by the network side device, an eighth pairing request message sent by the beneficial user equipment, where the eighth pairing request message carries geographic location information of the beneficial user equipment, and receiving a measurement report message sent by a user equipment near the geographic location of the beneficial user equipment, acquiring the identifier of the beneficial user equipment according to the eighth pairing request message, and acquiring the identifier of the candidate support user equipment according to the measurement report message.

In addition, before the receiving a measurement report message sent by a user equipment near the geographic location of the beneficial user equipment, the method further includes: after confirming permission of pairing of the beneficial user equipment according to the information of the beneficial user equipment, acquiring, by the radio access network device, a first pairing identifier of the beneficial user equipment, and sending, to the user equipment near the geographic location of the beneficial user equipment, a measurement request message carrying the first pairing identifier, where the measurement request message further carries a pairing constraint condition, and the user equipment, sending the measurement report message, near the geographic location of the beneficial user equipment is a user equipment satisfying the pairing constraint condition. The constraint condition may include a position relative to the beneficial user equipment, a channel quality requirement of short-distance communication with the beneficial user equipment, a capability requirement of the candidate support user equipment, a QoS requirement of a service, and so on. When satisfying the pairing constraint condition, the user equipment near the geographic location of the beneficial user equipment sends a measurement report message to the radio access network device, where the measurement report message carries the first pairing identifier. The network side device acquires the information of the beneficial user equipment according to the eighth pairing request message, and acquires the information of the support user equipment according to the measurement report message.

Figure 3:
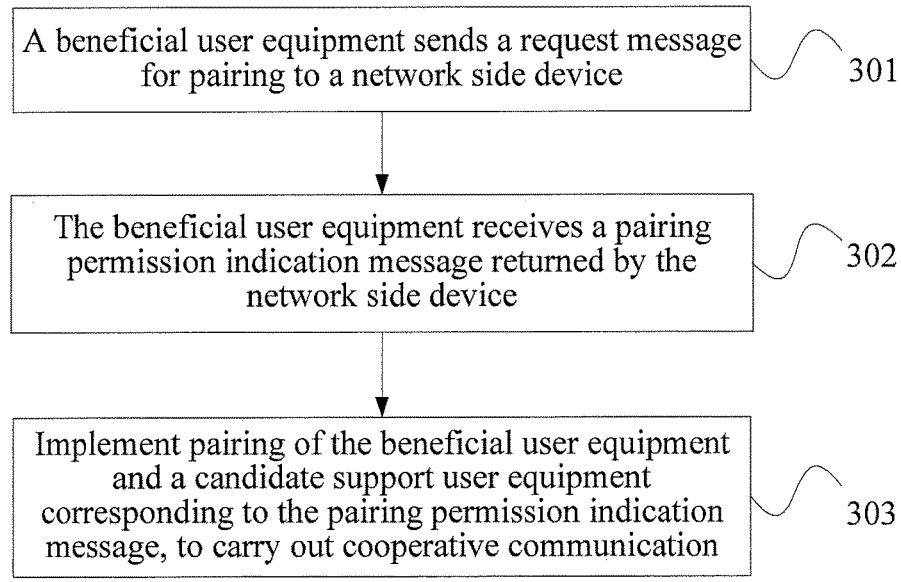
FIG. 3 is a flowchart of still another embodiment of a user equipment pairing processing method provided by the present invention.

FIG. 3 is a flowchart of still another embodiment of a user equipment pairing processing method provided by the present invention, and as shown in FIG. 3, the user equipment pairing processing method includes:

Step 301: A beneficial user equipment sends a request message for pairing to a network side device.

Step 302: The beneficial user equipment receives a pairing permission indication message returned by the network side device.

Step 303: Implement pairing of the beneficial user equipment and a candidate support user equipment corresponding to the pairing permission indication message, to carry out cooperative communication.

In accordance with Embodiment 1 and Embodiment 2, this embodiment of the present invention may also be implemented in various manners, which specifically include the following situations:

1. After step 301, the method includes: receiving, by the beneficial user equipment, a first pairing identifier sent by the network side device, where the first pairing identifier is allocated by the network side device to the beneficial user equipment; and sending, by the beneficial user equipment, by using a short-distance radio communication resource, a pairing invite message carrying the first pairing identifier to a neighboring user equipment; correspondingly, when receiving, through a short-distance radio communication resource, a pairing application message including the first pairing identifier, sending, by the candidate support user equipment, a first pairing success request message to the network side device, where the first pairing success request message includes the first pairing identifier and the identifier of the support user equipment; and after permitting the pairing of the beneficial user and the candidate support user, sending, by the network side device, a pairing permission indication identifier to the support user and the beneficial user, where the pairing permission indication message returned by the network side device further carries a second pairing identifier of the candidate support user equipment, and the implementing pairing of the beneficial user equipment and a candidate support user equipment corresponding to the pairing permission indication message specifically includes: implementing pairing of the beneficial user equipment and the candidate support user equipment according to the first pairing identifier and the second pairing identifier.

2. In step 301, the sending, by a beneficial user equipment, a request message for pairing to a network side device specifically includes: sending, by the beneficial user equipment, an eighth pairing request message to a radio access network device, where the eighth pairing request message carries geographic location information of the beneficial user equipment; after the sending an eighth pairing request message to a radio access network device, the method further includes: receiving, by the beneficial user equipment, a first pairing identifier fed back by the network side device, where the first pairing identifier is allocated by the network side device to the beneficial user equipment; and the pairing permission indication message returned by the network side device further carries a second pairing identifier of the candidate support user equipment, and the implementing pairing of the beneficial user equipment and a candidate support user equipment corresponding to the pairing permission indication message specifically includes: implementing pairing of the beneficial user equipment and the candidate support user equipment according to the first pairing identifier and the second pairing identifier.

3. The beneficial user equipment and the candidate support user equipment implement pairing processing through active negotiation, generate a third pairing identifier, and send a second pairing request message to the network side device, where the network side device may also be a radio access network device or a core network device. Before step 301, the method includes: implementing pairing processing of the beneficial user equipment and the candidate support user equipment, and generating a third pairing identifier; and the sending, by a beneficial user equipment, a request message for pairing to a network side device includes:

sending, by the beneficial user equipment, a second pairing request message to the network side device, where the second pairing request message carries an identifier of the beneficial user equipment, an identifier of the candidate support user equipment, and the third pairing identifier; or sending, by the beneficial user equipment, a third pairing request message to the network side device, where the third pairing request message carries an identifier of the beneficial user equipment and the third pairing identifier; and for the candidate support user equipment, correspondingly, sending, by the support user equipment, a third pairing request message to the network side device, where the third pairing request message carries the information of the beneficial user equipment and the third pairing identifier.

4. When the beneficial user equipment and the candidate support user equipment are in a connected state, the two user equipments implement pairing processing through active negotiation, and before step 301, the method further includes: implementing pairing processing of the beneficial user equipment and the candidate support user equipment, and exchanging peer radio network temporary identifiers, or exchanging peer radio bearer identifiers; and the sending, by a beneficial user equipment, a request message for pairing to a network side device includes: sending, by the beneficial user equipment, a fifth pairing request message to a radio access network device, where the fifth pairing request message carries the radio network temporary identifier and the radio bearer identifier of the beneficial user equipment and the radio network temporary identifier of the support user equipment, or the fifth pairing request message carries the radio network temporary identifier and the radio bearer identifier of the beneficial user equipment, and the radio network temporary identifier and the radio bearer identifier of the support user equipment; or sending, by the beneficial user equipment, a sixth pairing request message to a radio access network device, where the sixth pairing request message carries the radio network temporary identifier of the candidate support user equipment, or the sixth pairing request message carries the radio network temporary identifier and the radio bearer identifier of the candidate support user equipment.

Figure 4:
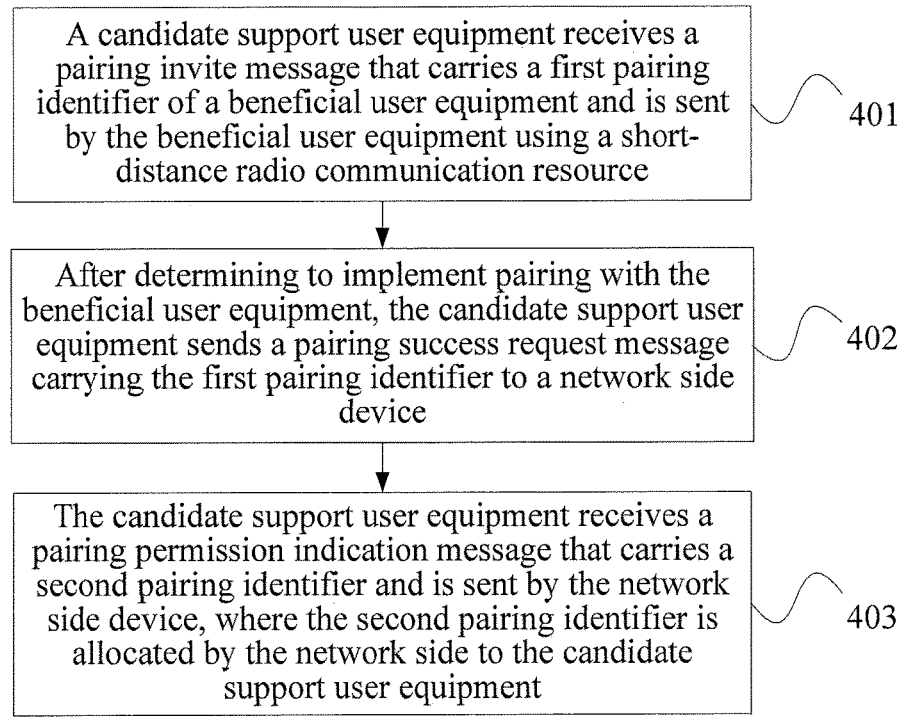
FIG. 4 is a flowchart of yet another embodiment of a user equipment pairing processing method provided by the present invention.

FIG. 4 is a flowchart of yet another embodiment of a user equipment pairing processing method provided by the present invention, and as shown in FIG. 4, the user equipment pairing processing method includes:

Step 401: A candidate support user equipment receives a pairing invite message that carries a first pairing identifier of a beneficial user equipment and is sent by the beneficial user equipment by using a short-distance radio communication resource.

Step 402: After determining to implement pairing with the beneficial user equipment, the candidate support user equipment sends a pairing success request message carrying the first pairing identifier to a network side device.

Step 403: The candidate support user equipment receives a pairing permission indication message that carries a second pairing identifier and is sent by the network side device, where the second pairing identifier is allocated by the network side to the candidate support user equipment.

Figure 5:
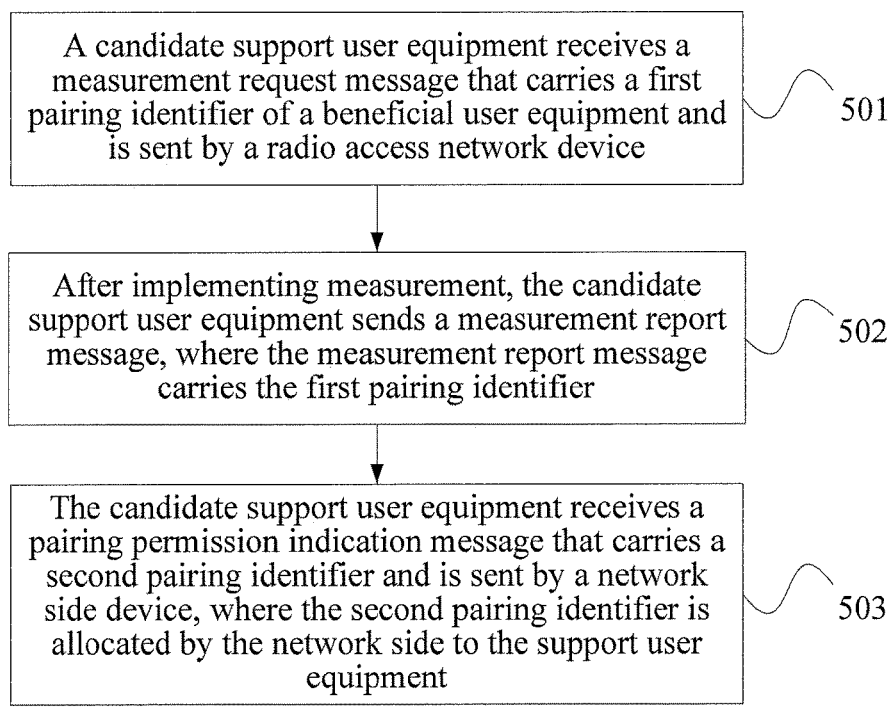
FIG. 5 is a flowchart of yet another embodiment of a user equipment pairing processing method provided by the present invention.

FIG. 5 is a flowchart of yet another embodiment of a user equipment pairing processing method provided by the present invention, and as shown in FIG. 5, the user equipment pairing processing method includes:

Step 501: A candidate support user equipment receives a measurement request message that carries a first pairing identifier of a beneficial user equipment and is sent by a radio access network device.

Step 502: After implementing measurement, the candidate support user equipment sends a measurement report message, where the measurement report message carries the first pairing identifier.

Step 503: The candidate support user equipment receives a pairing permission indication message that carries a second pairing identifier and is sent by a network side device, where the second pairing identifier is allocated by the network side to the support user equipment.

The following describes a specific implementing process of the user equipment pairing processing method provided by the present invention in detail with reference to FIG. 6 to FIG. 11.

Figure 6:
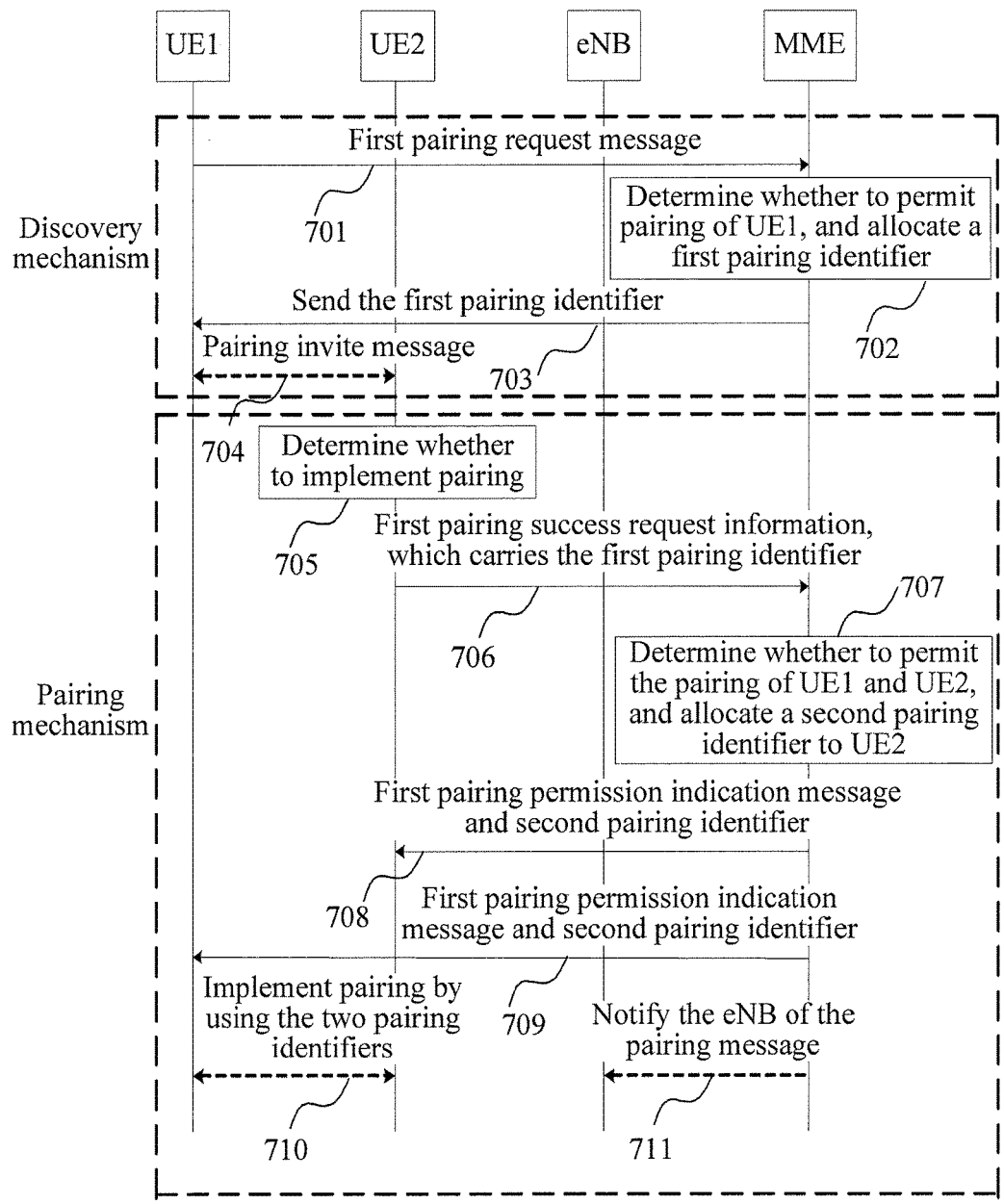
FIG. 6 is a schematic flowchart of a specific embodiment of the present invention.

FIG. 6 is a schematic flowchart of a specific embodiment of the present invention, and in this embodiment, a network side device allocates pairing identifiers for user equipments that raise a pairing request, where UE1 is a beneficial user equipment, UE2 is a candidate support user equipment, a mobility management entity (Mobility Management Entity, MME) is a core network device, and an evolved base station (Evolved Node B, eNB) is a radio access network device, and as shown in FIG. 6, the user equipment pairing processing procedure includes:

Step 701: After starting a pairing function, UE1 sends to the MME a first pairing request message. The first pairing request message may be carried in a service request (Service request), an attach request (Attach request), a tracking area update (Tracking Area Update, TAU) or a dedicated non-access stratum (Non-Access Stratum, NAS) message, and may also be notified to the eNB through a radio resource control protocol (Radio Resource Control, RRC) message and then the eNB further notifies the MME of the related pairing request.

Step 702: After receiving the first pairing request message, the MME determines, according to subscription information and capability information of UE1, whether to permit pairing of UE1; if the pairing of UE1 is permitted, allocates a first pairing identifier to UE1, where the first pairing identifier is saved by the MME as a context (context) of UE1, and the first pairing identifier may be a reused existing UE identifier, such as a temporary mobile subscriber identity (Temporary Mobile Subscriber Identity, TMSI) or an international mobile subscriber identification number (International Mobile Subscriber Identification Number, IMSI), and may also be a new identifier used for cooperative communication; and if the pairing of UE1 is not permitted, rejects the pairing request of UE1.

Step 703: The MME sends the first pairing identifier to the corresponding beneficial user equipment UE1, and may further notify the corresponding eNB.

Step 704: After receiving the corresponding first pairing identifier, the beneficial user equipment UE1 sends, through a short-distance resource, a pairing invite message which carries the corresponding first pairing identifier. The short-distance resource may be a resource which is allocated by the eNB to the user equipments for direct communication, and may also be other short-distance radio communications technologies, for example, WiFi, bluetooth, and device to device (Device to Device) communications technologies.

Step 705: UE2 receives the pairing invite information, and determines whether to implement pairing with UE1.

Step 706: If UE2 intends to implement pairing with UE1, UE2 sends first pairing success request information to the MME, where the first pairing success request information carries the first pairing identifier; otherwise, UE2 does not perform a related operation.

Step 707: The MME determines whether to permit the pairing of the two UEs, if the pairing is permitted, allocates a second pairing identifier to UE2; otherwise, rejects the pairing of the two UEs.

Step 708: The MME sends a first pairing permission indication message to UE2, where the first pairing permission indication message carries the second pairing identifier.

Step 709: The MME sends a first pairing permission indication message to UE1, where the first pairing permission indication message carries the second pairing identifier.

Step 710: UE1 and UE2 implement pairing by using the first pairing identifier and the second pairing identifier.

Step 711: The MME notifies the eNB of pairing information of UE1 and UE2.

When sending the first pairing permission indication message to UE1, if UE1 is in an idle (idle) state, the MME may trigger a new paging (paging) message, where the paging may be implemented only in a cell location of UE2 or in several peripheral cells of UE2, and does not need to be implemented based on a tracking area (Tracking Area, TA); and if UE1 is in a connected state, the MME notifies UE1 directly through a NAS message.

To further enhance the security, the MME may carry, in the pairing permission indication information, the second pairing identifier allocated to UE2, and notify UE1 that UE2 with the second pairing identifier may implement pairing with UE1 within a period of time in the future. UE1 and UE2 may implement pairing in the short-distance radio communication resource by using the two pairing identifiers. Further, a different pairing identifier may be allocated to each different cooperative bearer of the UE.

Figure 7:
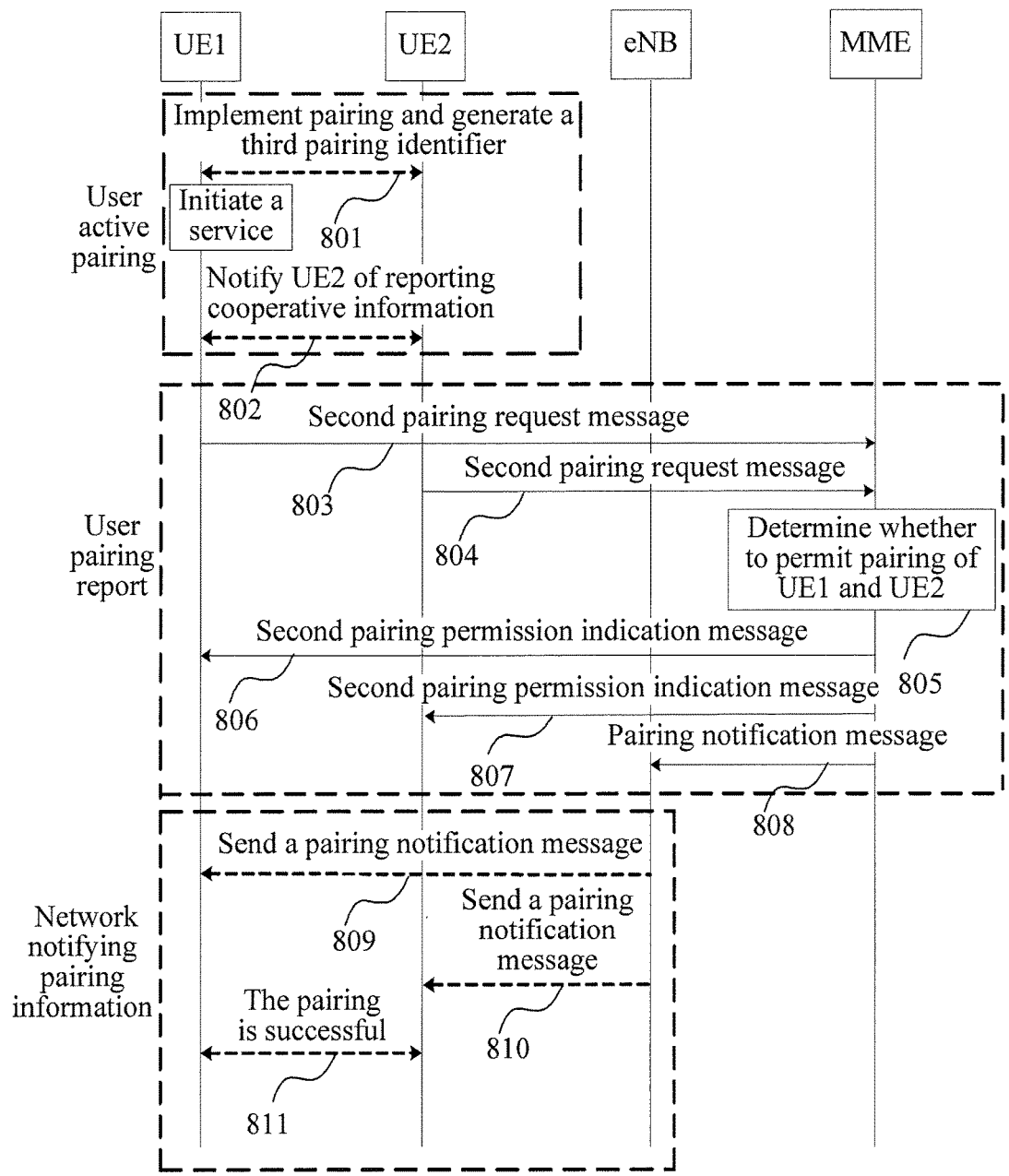
FIG. 7 is a schematic flowchart of another specific embodiment of the present invention.

FIG. 7 is a schematic flowchart of another specific embodiment of the present invention, and this embodiment depicts a schematic flowchart of user equipments implementing pairing processing through active negotiation when a network side device is a core network device; as shown in FIG. 7, UE1 is a beneficial user equipment, UE2 is a candidate support user equipment, an MME is a core network device, and an eNB is a radio access network device, and as shown in FIG. 7, the user equipment pairing processing procedure includes:

Step 801: UE1 and UE2 implement a pairing behavior after reaching an agreement in active negotiation, and generate through negotiation a pairing identifier, for example, a string of random numbers or specific numbers, as a common third pairing identifier of UE1 and UE2.

Step 802: UE1 notifies UE2 and further notifies a network, and reports cooperative information; this step may be performed when a service is initiated.

Step 803: UE1 sends a second pairing request message and the third pairing identifier to the MME.

Step 804: UE2 sends a second pairing request message and the third pairing identifier to the MME; alternatively, only one of UE1 and UE2 sends the information.

Step 805: The MME determines whether to permit pairing of UE1 and UE2.

Step 806: If the pairing is permitted, the MME sends a second pairing permission indication message to UE1; otherwise, rejects the pairing.

Step 807: If the pairing is permitted, the MME sends a second pairing permission indication message to UE2; otherwise, rejects the pairing.

Step 808: The MME sends a notification message indicating permission of pairing of UE1 and UE2 to the eNB.

A sequence of steps 806, 807 and 808 is not limited.

After it is determined that the UEs may implement cooperative communication, the corresponding UEs may be notified in another method, and the notification method may be that: the MME sends a notification message indicating permission of pairing of UE1 and UE2 to the eNB, and the eNB notifies UE1 and UE2 through an RRC message, where the RRC message may be a modified RRC reconfiguration message, and may also notify through a new RRC message; in this way, the MME does not need to directly notify the UEs. Further, the eNB may notify the two UEs of peer cell-radio network temporary identifiers (Cell-Radio Network Temporary Identifier, C-RNTI for short), or allocate new radio network temporary identifiers (Radio Network Temporary Identifier, RNTI for short) to the two UEs for use.

Step 809: The eNB sends a pairing notification message carrying the C-RNTI2 of UE2 to UE1.

Step 810: The eNB sends a pairing notification message carrying the C-RNTI1 of UE1 to UE2.

Step 811: The two UEs implement pairing, and the pairing is successful.

Figure 8:
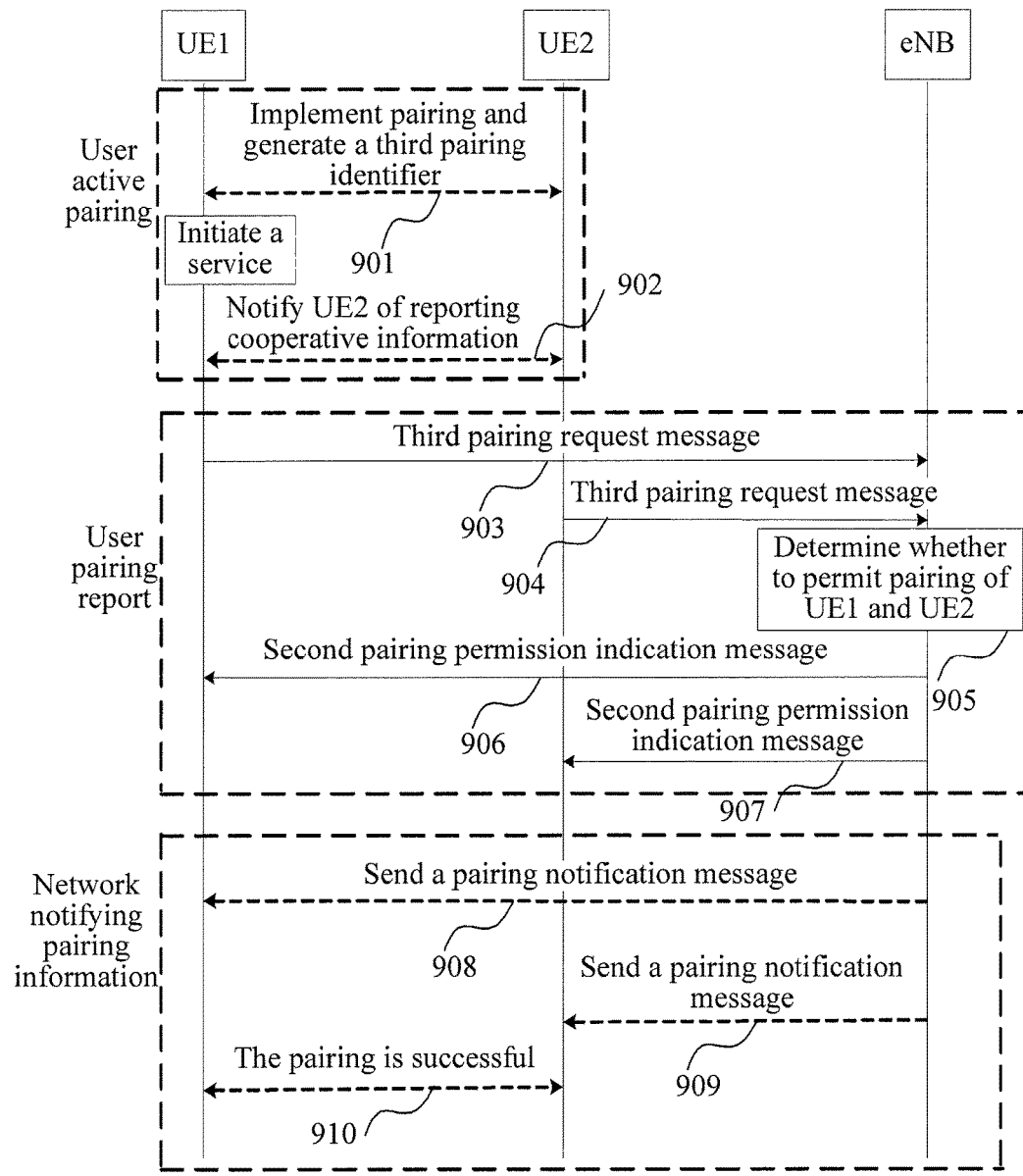
FIG. 8 is a schematic flowchart of still another specific embodiment of the present invention.

FIG. 8 is a schematic flowchart of another specific embodiment of the present invention, and this embodiment depicts a schematic flowchart of user equipments implementing pairing processing at an application layer when a network side device is a radio access network device, where UE1 is a beneficial user equipment, UE2 is a candidate support user equipment, and an eNB is a radio access network device, and as shown in FIG. 8, the user equipment pairing processing procedure in the application layer includes:

Step 901: UE1 and UE2 implement a pairing behavior through negotiation, and generate through negotiation a pairing identifier, for example, a string of random numbers or specific numbers, as a common third pairing identifier, where the third pairing identifier may also be an identifier originally allocated by the network side to UE1 or UE2, for example, the first pairing identifier or the second pairing identifier.

Step 902: UE1 notifies UE2 and further notifies a network, and reports cooperative information; this step may be performed when a service is initiated.

Step 903: UE1 sends a second pairing request message to the eNB, where the second pairing request message carries the third pairing identifier.

Step 904: UE2 sends a second pairing request message to the eNB, where the second pairing request message carries the third pairing identifier; alternatively, only one of UE1 and UE2 sends the information.

Step 905: The eNB determines whether to permit pairing of UE1 and UE2.

Step 906: If the pairing is permitted, the eNB sends a second pairing permission indication message to UE1; otherwise, rejects the pairing.

Step 907: If the pairing is permitted, the eNB sends a second pairing permission indication message to UE2; otherwise, rejects the pairing.

A sequence of steps 906 and 907 is not limited.

After it is determined that the UEs may implement cooperative communication, the corresponding UEs may be further notified, and the notification method may be that: the eNB notifies through an RRC reconfiguration message, and may also notify through a new RRC message. Further, the eNB may notify the two UEs of peer cell radio network temporary identifiers (Cell Radio Network Temporary Identifier, C-RNTI for short), or allocate new radio network temporary identifiers (Radio Network Temporary Identifier, RNTI for short) to the two UEs for use.

Step 908: The eNB sends a pairing notification message carrying the C-RNTI2 of UE2 to UE1.

Step 909: The eNB sends a pairing notification message carrying the C-RNTI1 of UE1 to UE2.

Step 910: The two UEs implement pairing, and the pairing is successful.

Figure 9:
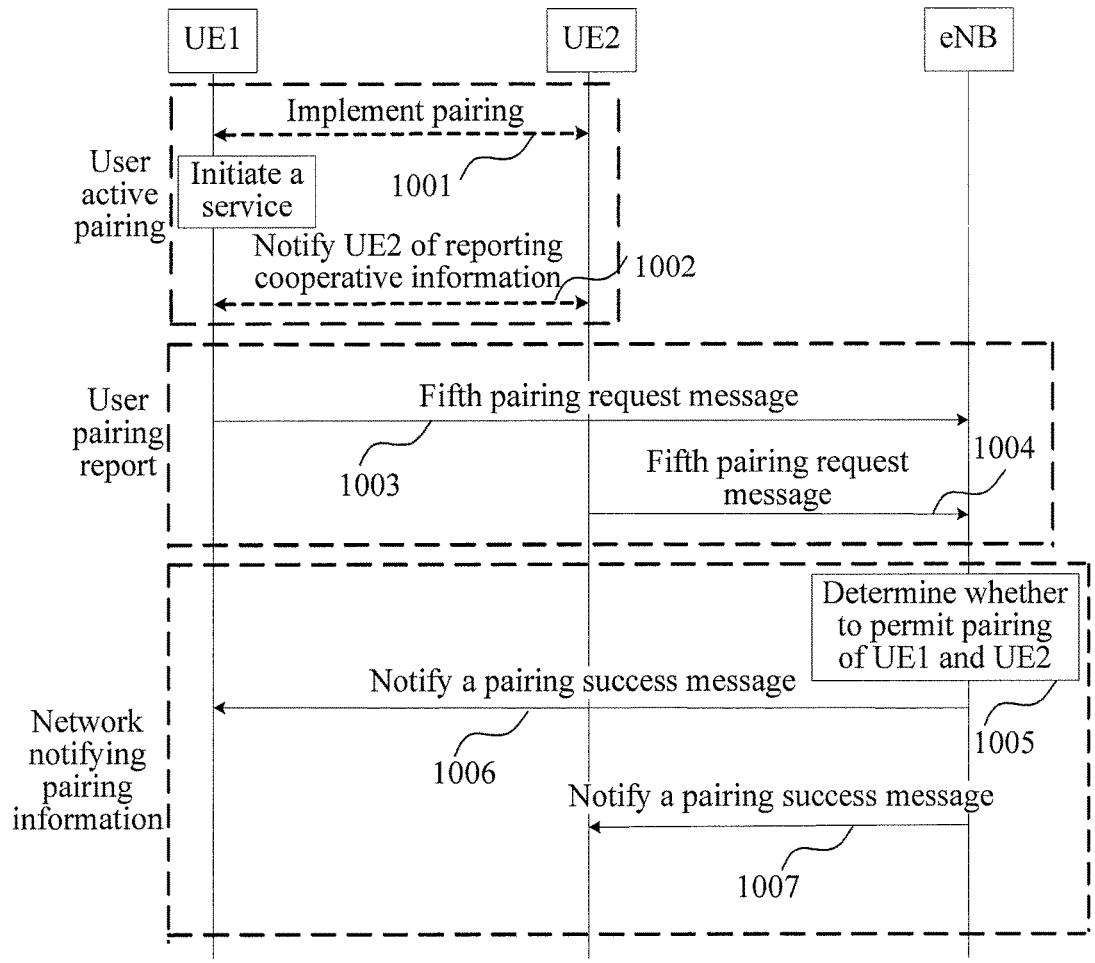
FIG. 9 is a schematic flowchart of yet another specific embodiment of the present invention.

An embodiment of the present invention provides a method of user equipments implementing pairing processing through active negotiation when a beneficial user equipment and a candidate support user equipment are in a connected state. FIG. 9 is a schematic flowchart of still another specific embodiment of the present invention, and this embodiment depicts a schematic flowchart of user equipments implementing pairing processing through active negotiation when the beneficial user equipment and the candidate support user equipment are in a connected state, where UE1 is the beneficial user equipment, UE2 is the candidate support user equipment, and an eNB is a radio access network device, and as shown in FIG. 9, the user equipment pairing processing procedure at an application layer includes:

Step 1001: UE1 and UE2 implement pairing through active negotiation, and exchange C-RNTIs of the users; and further, may further exchange radio bearer identifiers (Radio Bearer Identifier, RB ID for short) to be cooperated.

Step 1002: UE1 notifies UE2 and further notifies a network, and reports cooperative information; this step may be performed when a service is initiated.

Step 1003: UE1 sends a fifth pairing request message to the eNB, where the pairing request carries the C-RNTI of UE2.

Step 1004: UE2 sends a fifth pairing request message to the eNB, where the pairing request carries the C-RNTI of UE1.

In step 1003 and 1004, the two UEs may both send the pairing request, or only one of the two UEs may send the pairing request.

Step 1005: The eNB determines whether to permit pairing of UE1 and UE2, where the determination process may be implemented in the eNB, and may also be implemented in an MME or another network node.

Step 1006: After permitting the pairing, the network notifies UE1 of a pairing success message, and the network notifies through an RRC message, where the RRC message may be an RRC reconfiguration message, and may also notify through a new RRC message; otherwise, rejects the pairing.

Step 1007: After permitting the pairing, the network notifies UE2 of a pairing success message, and the network notifies through an RRC message, where the RRC message may be an RRC reconfiguration message, and may also notify through a new RRC message; otherwise, rejects the pairing.

Figure 10:
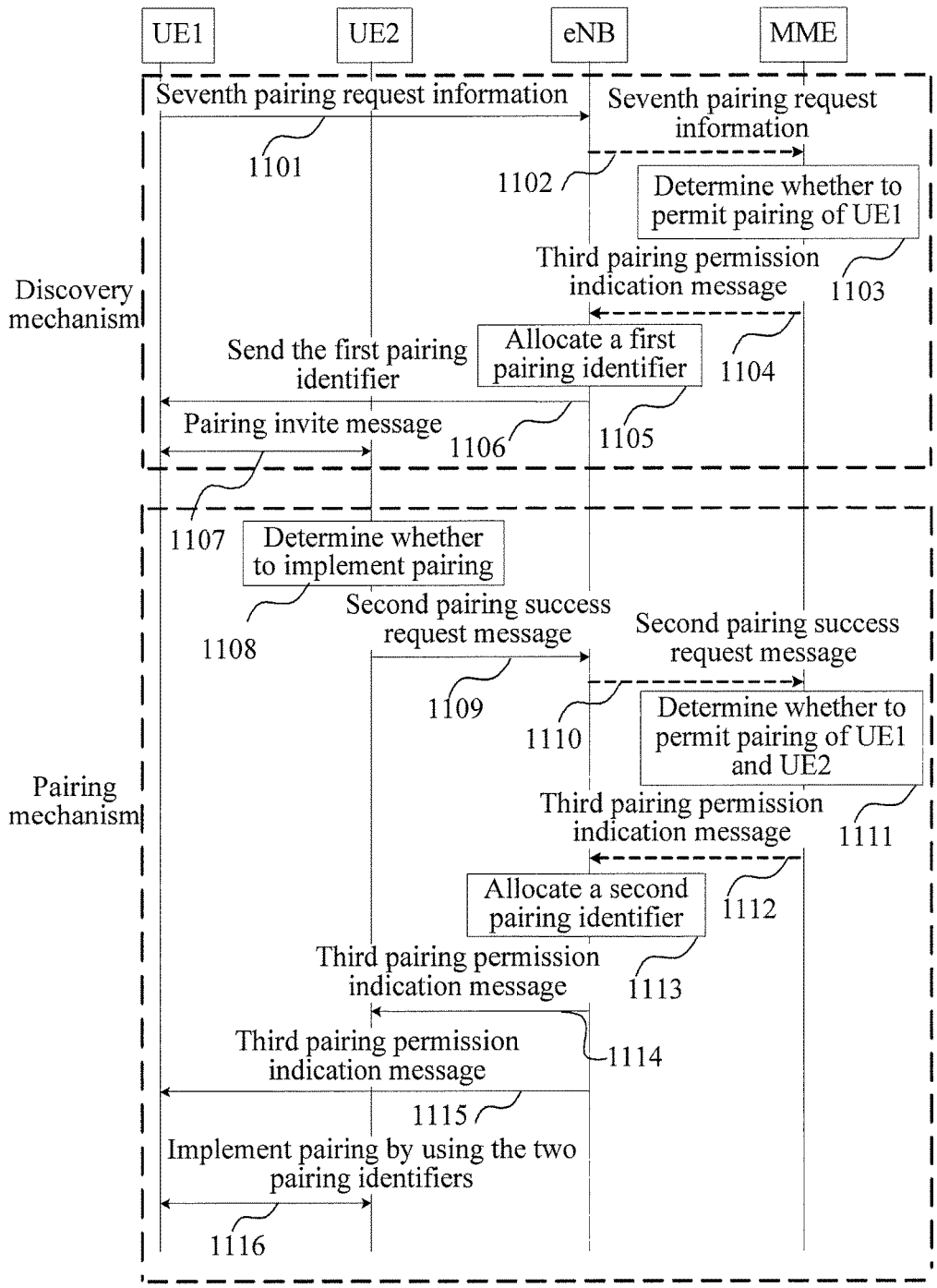
FIG. 10 is a schematic flowchart of yet another specific embodiment of the present invention.

FIG. 10 is a schematic flowchart of yet another specific embodiment of the present invention, and this embodiment depicts a schematic flowchart of user equipments implementing pairing processing when a network side device is a radio access network device; in this embodiment, the discovery and pairing processes are controlled by a radio access network side, an eNB allocates temporary identifiers, used as pairing identifiers, for users applying for pairing, and a UE sends, through a short-distance resource, a pairing invite message carrying the pairing identifier, where the short-distance resource may be a radio resource which is allocated by the eNB to the UEs for communication, and may also be other short-distance radio communications technologies, for example, WiFi and bluetooth. In FIG. 10, UE1 is a beneficial user equipment, UE2 is a candidate support user equipment, an MME is a core network device, and an eNB is a radio access network device, and as shown in FIG. 10, the user equipment pairing processing procedure includes:

Step 1101: After starting a pairing function, UE1 transmits, in an RRC message, seventh pairing request information to the eNB, where the RRC message may be an RRC Connection Request, an RRC Connection Setup Complete, or a new RRC message.

Step 1102: The eNB requests, according to the seventh pairing request message, the core network device for whether to permit pairing of UE1.

Step 1103: The core network device determines whether to permit pairing of UE1.

Step 1104: If the pairing is permitted, the core network device sends a third pairing permission indication message to the eNB; otherwise, rejects the pairing.

Step 1105: After receiving the seventh pairing request message and the third pairing permission indication message, the eNB allocates a first pairing identifier, where the identifier may be saved by the eNB as a context of UE1, and the identifier may be an RNTI or a new cooperative communication identifier.

The third pairing permission indication message involved in steps 1102 to 1104 and step 1105 may be omitted, and the eNB directly determines whether to permit pairing.

Step 1106: The eNB allocates and sends the first pairing identifier to UE1.

Step 1107: UE1 sends, through a short-distance radio communication resource, a pairing invite message which carries the first pairing identifier.

Step 1108: UE2 receives, through a short-distance radio communication resource, the corresponding pairing invite message, and determines whether to implement pairing with UE1.

Step 1109: UE2 discovers the pairing invite message of UE1 through the short-distance radio communication resource, and if intending to implement pairing with UE1, UE2 sends a second pairing success request message to the eNB, where the pairing success request message carries the first pairing identifier; otherwise, UE2 does not implement the pairing.

Step 1110: The eNB further sends the second pairing success request information to the core network device.

Step 1111: The MME determines whether to permit pairing of UE1 and UE2.

Step 1112: If the MME permits the pairing, the MME sends a third pairing permission indication message to the eNB; otherwise, rejects the pairing request; alternatively, the eNB may determine whether to permit pairing, and in this way, steps 1110 to 1111 may be omitted.

Step 1113: The eNB allocates a second pairing identifier to UE2.

Step 1114: The eNB sends the third pairing permission indication message to UE2.

Step 1115: The eNB sends the third pairing permission indication message to UE1; and to further enhance the security, the eNB may carry, in the third pairing permission indication message, the second pairing identifier allocated to UE2, and UE2 may implement pairing with UE1 within a period of time in the future.

Step 1116: UE1 and UE2 may implement pairing in short-distance communication by using the first pairing identifier and the second pairing identifier.

Further, the pairing identifier may be based on UE granularity, and may also be based on bearer granularity.

Further, steps 1113 to 1116 may also be performed as follows:

Step 1113: The eNB sends a pairing notification message carrying the RNTI2 of UE2 to UE1, where the message may be carried in an RRC reconfiguration message, and may also be carried in a new RRC message.

Step 1114: The eNB sends a pairing notification message carrying the RNTI1 of UE1 to UE2, where the message may be carried in an RRC reconfiguration message, and may also be carried in a new RRC message.

A sequence of steps 1113 and 1114 is not limited.

Step 1115: The two UEs implement pairing, and the pairing is successful.

Figure 11:
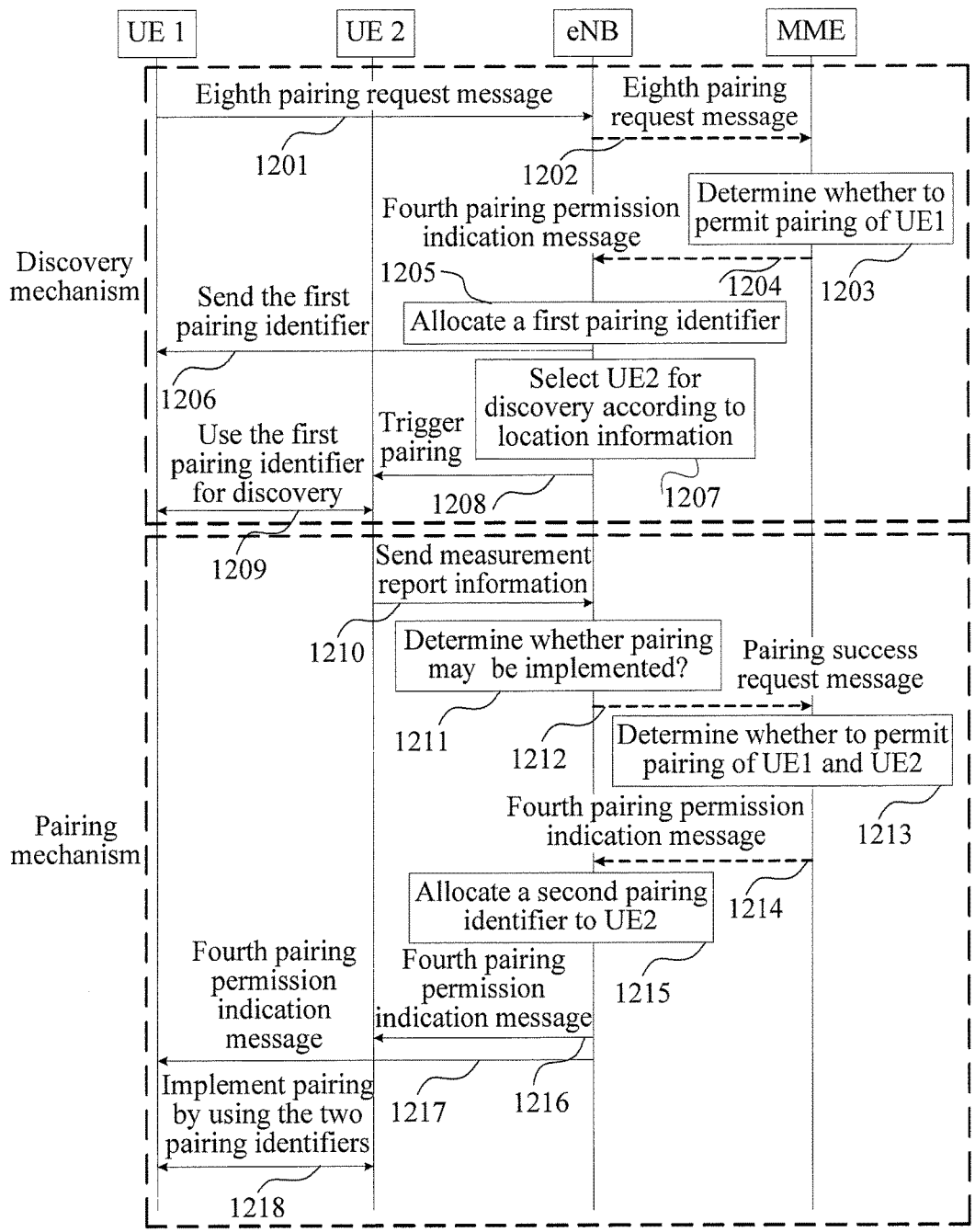
FIG. 11 is a schematic flowchart of yet another specific embodiment of the present invention.

FIG. 11 is a schematic flowchart of yet another specific embodiment of the present invention, and this embodiment depicts a schematic flowchart of user equipments implementing pairing processing under complete control of a network side device, where the discovery and pairing processes are controlled by a network side. In FIG. 11, UE1 is a beneficial user equipment, UE2 is a candidate support user equipment, an MME is a core network device, and an eNB is a radio access network device, and as shown in FIG. 11, the user equipment pairing processing procedure includes:

Step 1201: After starting a pairing function, UE1 carries an eighth pairing request message in an initiated Attach request, TAU or dedicated NAS message to be sent to the MME, or step 1202 is performed.

Step 1202: UE1 notifies the eNB of the eighth pairing request message through an RRC message, and then, the eNB notifies the MME (step 1202), where the RRC message may be an RRC Connection Request, an RRC Connection Setup Complete, or a new RRC message.

Step 1203: After receiving the eighth pairing request message, the MME determines whether to permit pairing of UE1, and if the pairing is permitted, sends a fourth pairing permission message to notify the eNB of finding a corresponding UE paired with UE1; otherwise, rejects the pairing.

Step 1204: The MME sends the fourth pairing permission message to the eNB.

Step 1205: After receiving the message, the base station acquires geographic location information of UE1 (for this process, the geographic location information of UE1 may also be carried in and obtained from the eighth pairing request message in step 1202), and allocates a first pairing identifier.

Step 1206: The eNB sends the first pairing identifier to UE1.

Step 1207: The eNB selects a suitable UE2 nearby according to the geographic location information, triggers a short-distance discovery mechanism between the UEs, and notifies UE2 of the first pairing identifier; further, the eNB may allocate a suitable short-distance radio communication resource and notify UE1 and UE2 of the allocated resource for short-distance discovery and measurement between the UEs.

Step 1208: Trigger pairing, and in this process, multiple UEs may be triggered to implement discovery and measurement, and UE1 sends pairing invite information through the short-distance radio communication resource, where the information includes the first pairing identifier.

Step 1209: UE2 discovers and measures channel quality of the short-distance radio resource by using the first pairing identifier.

Step 1210: UE2 sends measurement report information to the eNB, and multiple UEs may report corresponding measurement results for the eNB to choose.

Step 1211: The eNB determines, according to the measurement report situation, whether UE2 may be paired.

Step 1212: If UE2 may be paired, send a pairing request message to the MME; otherwise, reject the pairing.

Step 1213: The MME determines, according to subscription information and equipment capability information, whether to permit pairing of UE1 and UE2.

Step 1214: If the pairing is permitted, the MME sends a fourth pairing permission indication message to the eNB; alternatively, the eNB may make the determination, and in this way, steps 1212 to 1214 may be omitted.

Step 1215: The eNB allocates a second pairing identifier to UE2.

Step 1216: The eNB sends the fourth pairing permission indication message to UE2, where the fourth pairing permission indication message carries the second pairing identifier.

Step 1217: The eNB sends the fourth pairing permission indication message to UE1, where the fourth pairing permission indication message carries the second pairing identifier.

Step 1218: Implement pairing by using the first pairing identifier and the second pairing identifier.

If necessary, the MME may further trigger a manner of finding a user in an idle state to implement pairing. A special mechanism similar to paging, which may also be a mechanism similar to system broadcasting, is used to notify the user in the idle state to implement pairing.

A class of new paging causes or new RNTIs or new paging resources or new broadcast information are defined. The paging message or broadcast message may further carry a related message to be sent by UE1 in a short distance, and further, the message may carry a QoS requirement, which requires that a UE implements corresponding pairing only when short-distance communication quality of the UE exceeds a certain threshold.

The UE receiving the message may determine whether to trigger a discovery mechanism, and if yes, implements measurement, and reports corresponding measurement information after initiating access; further, a new (RRC establish cause) may be added to notify the eNB that the RRC connection is used for pairing. The pairing ID may be based on UE granularity, and may also be based on bearer granularity. In this case, the user equipment pairing processing procedure is similar to that shown in FIG. 11, and details are not repeatedly described herein.

In the user pairing processing method provided by each embodiment of the present invention, the network side device controls a pairing manner of the user equipments, determines the candidate support user equipment and the beneficial user equipment, and effectively implements support of the support user equipment to data transmission of the beneficial user equipment. Compared with a defect of the prior art that a solution of how to implement organization and coordination between the user equipments is not provided, with the technical solutions provided by the embodiments of the present invention, cooperative communication can be more effectively implemented.

A person of ordinary skill in the art should understand that all or a part of the steps of the method according to each embodiment of the present invention may be implemented by a program instructing relevant hardware. The program may be stored in a computer readable storage medium. When the program runs, the steps of the method according to each embodiment of the present invention are performed. The storage medium may be any medium that is capable of storing program codes, such as a ROM, a RAM, a magnetic disk, or an optical disc.

Figure 12:
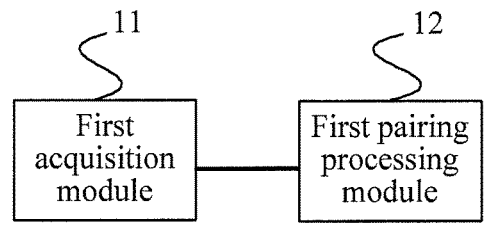
FIG. 12 is a schematic structural diagram of an embodiment of a network side device provided by an embodiment of the present invention.

FIG. 12 is a schematic structural diagram of an embodiment of a network side device provided by an embodiment of the present invention, and as shown in FIG. 12, the network side device includes a first acquisition module 11 and a first pairing processing module 12, where the first acquisition module 11 is configured to acquire pairing request information of a beneficial user equipment and a candidate support user equipment that are to be paired, where the pairing request information includes an identifier of the beneficial user equipment and an identifier of the candidate support user equipment, or the pairing request information includes an identifier of the beneficial user equipment, an identifier of the candidate support user equipment, and a common pairing identifier; and the first pairing processing module 12 is connected to the first acquisition module 11, and configured to implement pairing of the beneficial user equipment and the candidate support user equipment according to the pairing request information, and send a pairing success message to the beneficial user equipment and the candidate support user equipment.

According to the network side device provided by the embodiment of the present invention, the network side device controls a pairing manner of the user equipments, determines the candidate support user equipment and the beneficial user equipment, and effectively implements support of the support user equipment to data transmission of the beneficial user equipment. Compared with a defect of the prior art that a solution of how to implement organization and coordination between the user equipments is not provided, with the technical solution provided by the embodiment of the present invention, cooperative communication can be more effectively implemented.

In the embodiment of the present invention, the first acquisition module 11 is specifically configured to receive a first pairing request message sent by the beneficial user equipment and a first pairing success request message sent by the candidate support user equipment, where the first pairing request message carries the identifier of the beneficial user equipment, and the first pairing success request message carries the identifier of the candidate support user equipment and a first pairing identifier allocated to the beneficial user equipment; and the first pairing processing module 12 is connected to the first acquisition module 11, and is specifically configured to, after implementing pairing of the beneficial user equipment and the candidate support user equipment according to the pairing request information, send a first pairing permission indication message to the beneficial user equipment and the candidate support user equipment, respectively.

When the network side device is a radio access network device, the first pairing processing module 12 is specifically configured to determine, according to any one or a combination of the following parameters, whether to permit pairing of the beneficial user equipment and the candidate support user equipment, if the pairing is permitted, notify the beneficial user equipment and the support user equipment that the pairing is permitted; and if the pairing is not permitted, notify the beneficial user equipment and the support user equipment that the pairing is rejected, where the parameters include:

a channel state parameter between the beneficial user equipment and the radio access network device, a channel state parameter between the support user equipment and the radio access network device, a channel state parameter between the support user equipment and the beneficial user equipment, and a network load parameter.

In the embodiment of the present invention, after the network side device acquires the information of the beneficial user equipment and the support user equipment to be paired, the core network device may determine, according to subscription information and/or terminal capability information of the beneficial user equipment and the support user equipment, whether to permit pairing of the beneficial user equipment and the support user equipment, and the radio access network device may determine, according to any one or a combination of the following parameters, whether to permit pairing of the beneficial user equipment and the support user equipment, where the parameters include: a channel state parameter between the beneficial user equipment and the radio access network device, a channel state parameter between the support user equipment and the radio access network device, a channel state parameter between the support user equipment and the beneficial user equipment, and a network load parameter. In the technical solution provided by the embodiment of the present invention, that pairing is performed for two user equipments in cooperative communication is finally determined by the network side.

In accordance with the embodiment shown in FIG. 1 of the present invention, how to determine pairing of two user equipments in cooperative communication may be implemented in various manners, and correspondingly the network side device may also have various implementing solutions.

Figure 13:
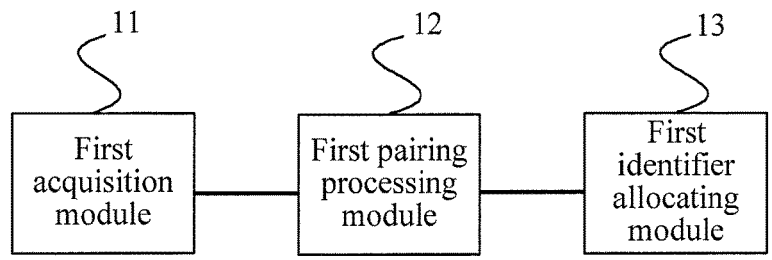
FIG. 13 is a schematic structural diagram of another embodiment of a network side device provided by an embodiment of the present invention.

FIG. 13 is a schematic structural diagram of another embodiment of a network side device provided by an embodiment of the present invention, and as shown in FIG. 13, the first acquisition module 11 is specifically configured to receive a first pairing request message sent by the beneficial user equipment and a first pairing success request message sent by the candidate support user equipment, where the first pairing request message carries the identifier of the beneficial user equipment, and the first pairing success request message carries the identifier of the candidate support user equipment and a first pairing identifier allocated to the beneficial user equipment. The first pairing processing module 12 is specifically configured to, after implementing pairing of the beneficial user equipment and the candidate support user equipment according to the pairing request information, send a first pairing permission indication message to the beneficial user equipment and the candidate support user equipment, respectively. The network side device further includes a first identifier allocating module 13, connected to the first pairing processing module 12, and configured to allocate the first pairing identifier to the beneficial user equipment, and allocate a second pairing identifier to the candidate support user equipment.

Based on FIG. 12 and as shown in FIG. 12, further, the first acquisition module 11 is specifically configured to receive a second pairing request message sent by the beneficial user equipment or the candidate support user equipment, where the second pairing request message carries the identifier of the beneficial user equipment, the identifier of the candidate support user equipment, and a common third pairing identifier of the beneficial user equipment and the candidate support user equipment; or configured to receive a third pairing request message sent by the beneficial user equipment and the candidate support user equipment, respectively, where the third pairing request message sent by the beneficial user equipment carries the identifier of the beneficial user equipment, and the common third pairing identifier of the beneficial user equipment and the candidate support user equipment; and the third pairing request message sent by the candidate support user equipment carries the identifier of the candidate support user equipment, and the common third pairing identifier of the beneficial user equipment and the candidate support user equipment; and the first pairing processing module 12 is specifically configured to, after implementing pairing of the beneficial user equipment and the candidate support user equipment according to the pairing request information, send a second pairing permission indication message to the beneficial user equipment and the candidate support user equipment, respectively.

In the embodiment, the beneficial user equipment and the support user equipment implement pairing processing, generate the third pairing identifier, and send the second pairing request message to the network side device, where the network side device in this embodiment may also be a radio access network device or a core network device.

Figure 14:
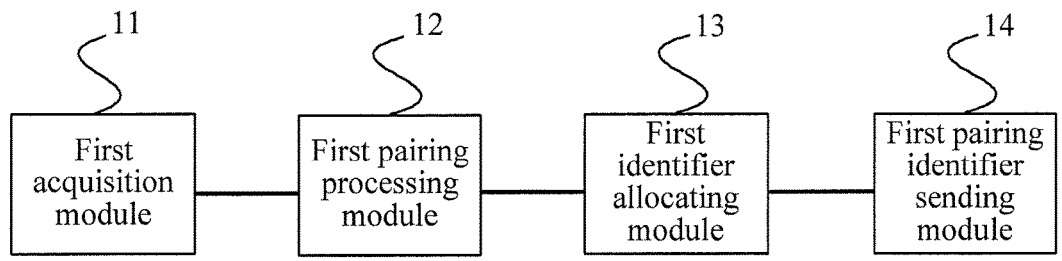
FIG. 14 is a schematic structural diagram of still another embodiment of a network side device provided by an embodiment of the present invention.

FIG. 14 is a schematic structural diagram of still another embodiment of a network side device provided by an embodiment of the present invention, and the network side device in this embodiment is a core network device, and based on the network side device in the embodiment shown in FIG. 13, the core network device further includes:

a first pairing identifier sending module 14, connected to the first pairing processing module 12, and configured to send a pairing notification message to a radio access network device, where the pairing notification message carries the identifier of the beneficial user equipment and the first pairing identifier, and the identifier of the support user equipment and the second pairing identifier.

Based on FIG. 12 and as shown in FIG. 12, further, if the network side device in this embodiment is a core network device, the first acquisition module 11 is specifically configured to receive a fourth pairing request message sent by a radio access network device, and acquire, from the fourth pairing request message, the pairing request information of the beneficial user equipment and the support user equipment; and the first pairing processing module 12 is specifically configured to, after implementing pairing of the beneficial user equipment and the candidate support user equipment according to the pairing request information, return a third pairing permission indication message to the radio access network device, and notify, by the radio access network device, the beneficial user equipment and the candidate support user equipment. In this embodiment, the radio access network device forwards the pairing request message to the core network device.

Further, in the network side device shown in FIG. 12, if the network side device is a radio access network device, the first acquisition module 11 is specifically configured to receive a fifth pairing request message sent by the beneficial user equipment or the support user equipment, acquire, from the fifth pairing request message, a radio network temporary identifier of the beneficial user equipment and a radio network temporary identifier of the candidate support user equipment, or acquire, by the radio access network device from the fifth pairing request message, a radio network temporary identifier and a radio bearer identifier of the beneficial user equipment, and a radio network temporary identifier and a radio bearer identifier of the candidate support user equipment; or the first acquisition module 11 is specifically configured to receive a sixth pairing request message sent by the beneficial user equipment and the candidate support user equipment, respectively, acquire, from the sixth pairing request message sent by the beneficial user equipment, a radio network temporary identifier of the candidate support user equipment, and acquire, from the sixth pairing request message sent by the support user equipment, a radio network temporary identifier of the beneficial user equipment, or specifically configured to acquire, from the sixth pairing request message sent by the beneficial user equipment, a radio network temporary identifier and a radio bearer identifier of the candidate support user equipment, and acquire, from the sixth pairing request message sent by the candidate support user equipment, a radio network temporary identifier and a radio bearer identifier of the beneficial user equipment. In this situation, when the beneficial user equipment and the candidate support user equipment are in a connected state, pairing is implemented at application layers of the two user equipments, and cell-radio network temporary identifiers, or radio bearer identifiers and radio network temporary identifiers are exchanged; therefore, the cell-radio network temporary identifiers, or the radio bearer identifiers and the radio network temporary identifiers of the two user equipments may be used as their identifiers, and the beneficial user equipment or the support user equipment requests, through the fifth pairing request message or the sixth pairing request message, pairing permission from the radio access network device.

Figure 15:
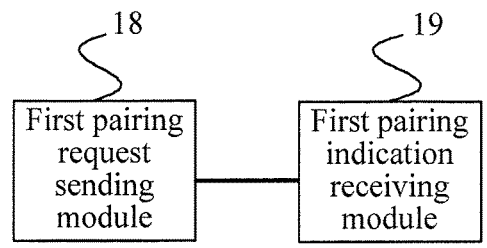
FIG. 15 is a schematic structural diagram of an embodiment of a radio access network device provided by an embodiment of the present invention.

FIG. 15 is a schematic structural diagram of an embodiment of a radio access network device provided by an embodiment of the present invention, and as shown in FIG. 15, the radio access network device includes a first pairing request sending module 18 and a first pairing indication receiving module 19. The first pairing request sending module 18 is configured to send a fourth pairing request message to a core network device, where the fourth pairing request message carries pairing request information of a beneficial user equipment and the candidate support user equipment, the pairing request information includes an identifier of the beneficial user equipment and an identifier of the candidate support user equipment, or the pairing request information includes an identifier of the beneficial user equipment, an identifier of the candidate support user equipment, and a common pairing identifier; and the first pairing indication receiving module 19 is connected to the first pairing request sending module 18, and configured to receive third pairing permission indication information that is returned by the core network device and confirms permission of pairing of the beneficial user equipment and the candidate support user equipment.

This embodiment depicts a situation that the radio access network device forwards a pairing request message to the core network device, the first pairing request sending module 18 of the radio access network device sends the fourth pairing request message to the core network device, and the first pairing indication receiving module 19 receives the third pairing permission indication information.

Figure 16:
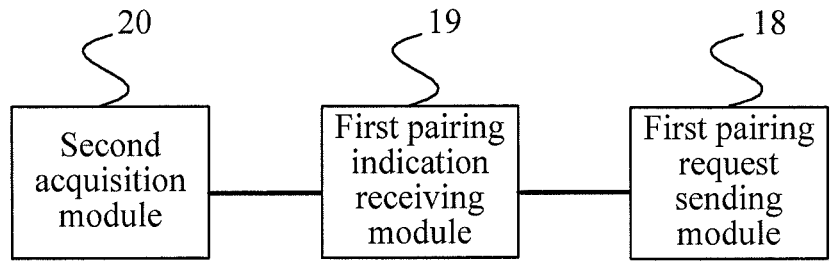
FIG. 16 is a schematic structural diagram of another embodiment of a radio access network device provided by an embodiment of the present invention.

On the basis of the foregoing embodiment, FIG. 16 is a schematic structural diagram of another embodiment of a radio access network device provided by an embodiment of the present invention, and as shown in FIG. 16, the radio access network device further includes a second acquisition module 20. The second acquisition module 20 is connected to the first pairing request sending module 18, and configured to, before the first pairing request sending module sends the fourth pairing request message to the core network device, receive a seventh pairing request message sent by the beneficial user equipment, receive a second pairing success request message sent by the support user equipment, and acquire, according to the seventh pairing request message and the second pairing success request message, the identifier of the beneficial user equipment and the identifier of the candidate support user equipment; or configured to, before the first pairing request sending module sends the fourth pairing request message to the core network device, receive an eighth pairing request message sent by the beneficial user equipment, where the eighth pairing request message carries geographic location information of the beneficial user equipment, and receive a measurement report message sent by a user equipment near the geographic location of the beneficial user equipment, acquire the identifier of the beneficial user equipment according to the eighth pairing request message, and acquire the identifier of the support user equipment according to the measurement report message.

Figure 17:
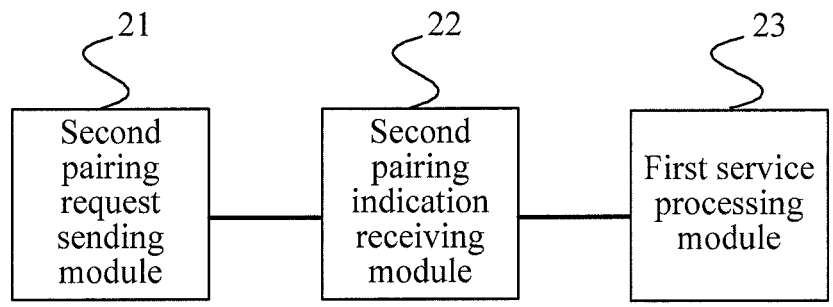
FIG. 17 is a schematic structural diagram of an embodiment of a user equipment provided by an embodiment of the present invention.

FIG. 17 is a schematic structural diagram of an embodiment of a user equipment provided by an embodiment of the present invention, and as shown in FIG. 17, the user equipment includes:

a second pairing request sending module 21, configured to send a request message for pairing to a network side device; a second pairing indication receiving module 22, connected to the second pairing request sending module 21, and configured to receive a pairing permission indication message returned by the network side device; and a first service processing module 23, connected to the second pairing indication receiving module 22, and configured to implement cooperative communication with a candidate support user equipment corresponding to the pairing permission indication message.

In accordance with the embodiment shown in FIG. 1 of the present invention, how to determine pairing of two user equipments in cooperative communication may be implemented in various manners, and correspondingly the user equipment may also have various implementing solutions.

Figure 18:
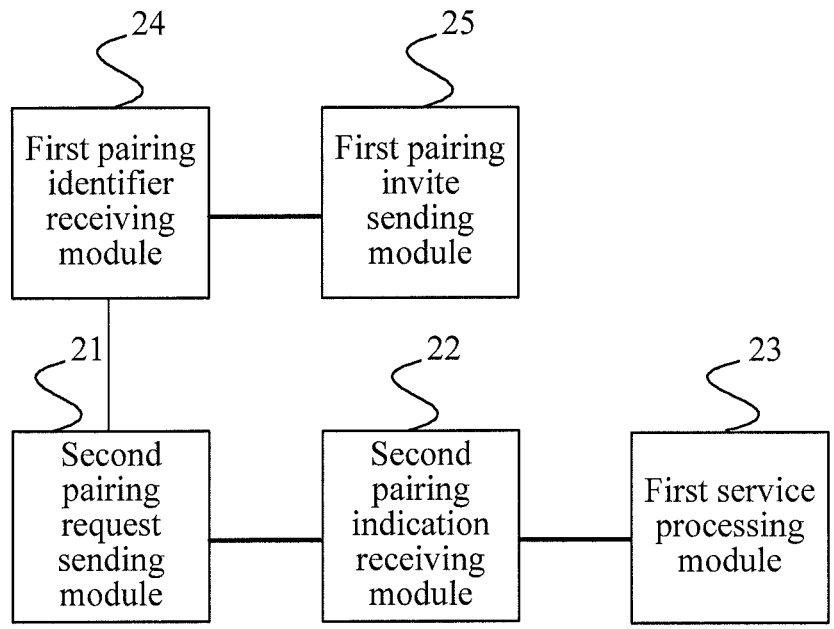
FIG. 18 is a schematic structural diagram of another embodiment of a user equipment provided by an embodiment of the present invention.

FIG. 18 is a schematic structural diagram of another embodiment of a user equipment provided by an embodiment of the present invention, and as shown in FIG. 18, the user equipment further includes a first pairing identifier receiving module 24, connected to the second pairing request sending module 21, and configured to receive a first pairing identifier fed back by the network side device, where the first pairing identifier is allocated by the network side device to a beneficial user equipment; and a first pairing invite sending module 25, connected to the first pairing identifier receiving module 24, and configured to send, using a short-distance resource, a pairing invite message carrying the first pairing identifier to a neighboring user equipment, where the pairing permission indication message received by the second pairing indication receiving module 22 further carries a second pairing identifier of the support user equipment, and the first service processing module is specifically configured to implement pairing with the support user equipment according to the first pairing identifier and the second pairing identifier, to carry out cooperative communication. In this embodiment, the network side device receives the first pairing request message sent by the beneficial user equipment and the first pairing success request message sent by the support user equipment.

Figure 19:
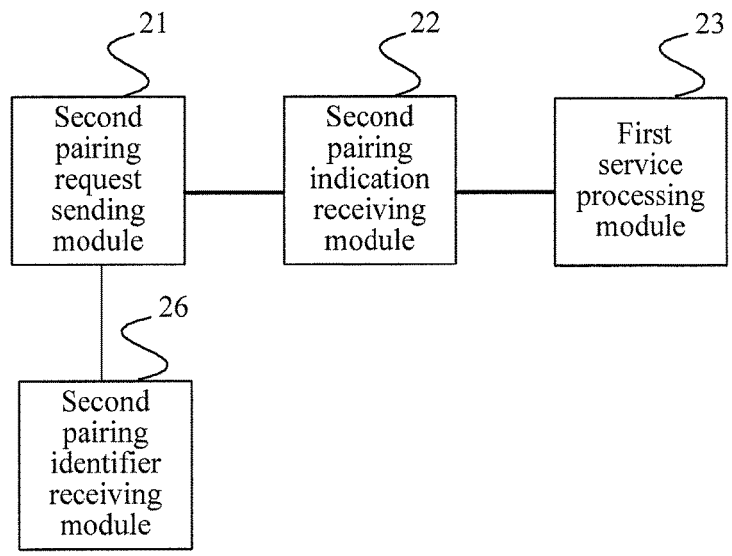
FIG. 19 is a schematic structural diagram of another embodiment of a user equipment provided by an embodiment of the present invention.

FIG. 19 is a schematic structural diagram of another embodiment of a user equipment provided by an embodiment of the present invention, and as shown in FIG. 19, the user equipment further includes a second pairing identifier receiving module 26. The second pairing identifier receiving module 26 is connected to the second pairing request sending module 21, the second pairing request sending module 21 is specifically configured to send an eighth pairing request message to a radio access network device, where the eighth pairing request message carries geographic location information of the beneficial user equipment; and the second pairing identifier receiving module 26 is configured to receive a first pairing identifier fed back by the network side device, where the first pairing identifier is allocated by the network side device to the beneficial user equipment; the pairing permission indication message received by the second pairing indication receiving module 22 further carries a second pairing identifier of the candidate support user equipment, and the first service processing module is specifically configured to implement pairing with the support user equipment according to the first pairing identifier and the second pairing identifier, to carry out cooperative communication. In this embodiment, the radio access network device receives or forwards, to the core network device, the first pairing request message sent by the beneficial user equipment and the first pairing success request message sent by the support user equipment.

Figure 20:
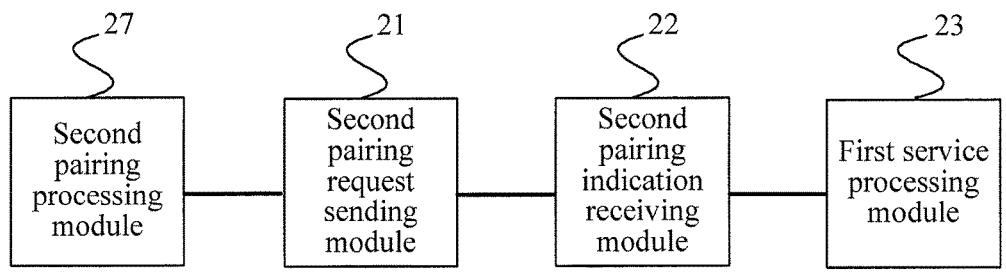
FIG. 20 is a schematic structural diagram of still another embodiment of a user equipment provided by an embodiment of the present invention.

FIG. 20 is a schematic structural diagram of still another embodiment of a user equipment provided by an embodiment of the present invention, and as shown in FIG. 20, the user equipment further includes a second pairing processing module 27, connected to the second pairing request sending module 21, and configured to implement pairing processing with the support user equipment and generate a third pairing identifier, where the second pairing request sending module 21 is specifically configured to: when initiating a service, send a second pairing request message to the network side device, where the second pairing request message carries an identifier of the beneficial user equipment, an identifier of the candidate support user equipment, and the third pairing identifier; or specifically configured to: when initiating a service, send a third pairing request message to the network side device, where the third pairing request message carries an identifier of the beneficial user equipment and the third pairing identifier.

Figure 21:
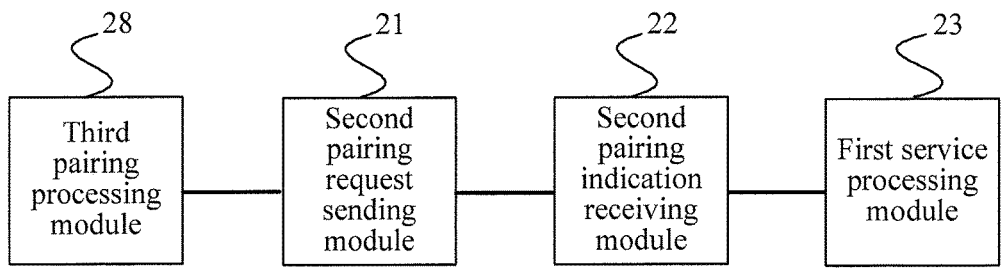
FIG. 21 is a schematic structural diagram of yet another embodiment of a user equipment provided by an embodiment of the present invention.

FIG. 21 is a schematic structural diagram of yet another embodiment of a user equipment provided by an embodiment of the present invention, and as shown in FIG. 21, the user equipment further includes a third pairing processing module 28, connected to the second pairing request sending module 21, and configured to implement pairing with the candidate support user equipment, and exchange peer radio network temporary identifiers, or exchange peer radio network temporary identifiers and radio bearer identifiers, where the second pairing request sending module 21 is specifically configured to: when initiating a service, send, by the beneficial user equipment, a fifth pairing request message to a radio access network device, where the fifth pairing request message carries the radio network temporary identifier of the beneficial user equipment and the radio network temporary identifier of the candidate support user equipment, or the fifth pairing request message carries the radio network temporary identifier and the radio bearer identifier of the beneficial user equipment, and the radio network temporary identifier and the radio bearer identifier of the candidate support user equipment; or the second pairing request sending module 21 is specifically configured to: when initiating a service, send, by the beneficial user equipment, a sixth pairing request message to a radio access network device, where the sixth pairing request message carries the radio network temporary identifier of the candidate support user equipment, or the sixth pairing request message carries the radio network temporary identifier and the radio bearer identifier of the candidate support user equipment.

In Embodiment 4 and Embodiment 5, after pairing processing is implemented at application layers of the beneficial user equipment and the candidate support user equipment, a third pairing identifier is generated, and a second pairing request message is sent to the network side device, where the network side device in this embodiment may also be a radio access network device or a core network device. Embodiment 5 depicts a situation that, when the beneficial user equipment and the candidate support user equipment are in a connected state, pairing is implemented at application layers of the two user equipments, and cell-radio network temporary identifiers and/or radio bearer identifiers are exchanged; therefore, the cell-radio network temporary identifiers or the radio bearer identifiers of the two user equipments may be used as their identifiers, and the beneficial user equipment or the candidate support user equipment requests, through the fifth pairing request message or the sixth pairing request message, pairing permission from the radio access network device.

Figure 22:
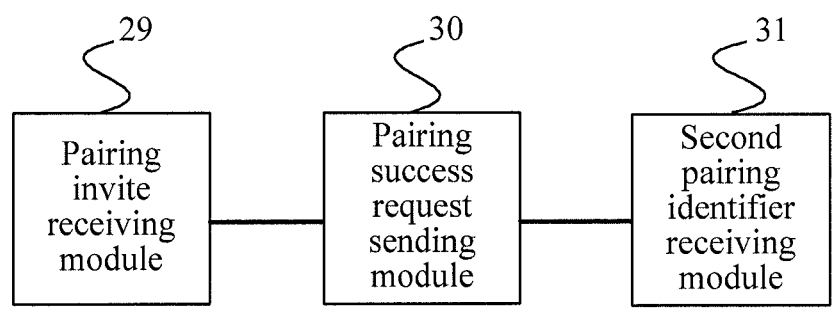
FIG. 22 is a schematic structural diagram of yet another embodiment of a user equipment provided by an embodiment of the present invention.

FIG. 22 is a schematic structural diagram of yet another embodiment of a user equipment provided by an embodiment of the present invention, and as shown in FIG. 22, the user equipment includes a pairing invite receiving module 29, configured to receive a pairing invite message that carries a first pairing identifier of a beneficial user equipment and is sent by the beneficial user equipment by using a short-distance resource; a pairing success request sending module 30, connected to the pairing invite receiving module 29, and configured to, after determining to implement pairing with the beneficial user equipment, send a pairing success request message carrying the first pairing identifier to a network side device; and a second pairing identifier receiving module 31, configured to receive a pairing permission indication message that carries a second pairing identifier and is sent by the network side device, where the second pairing identifier is allocated by the network side to a candidate support user equipment. In Embodiment 6, the beneficial user equipment sends, by using the short-distance resource, the pairing invite message carrying the first pairing identifier of the beneficial user equipment, and implements pairing with the candidate support user equipment.

Figure 23:
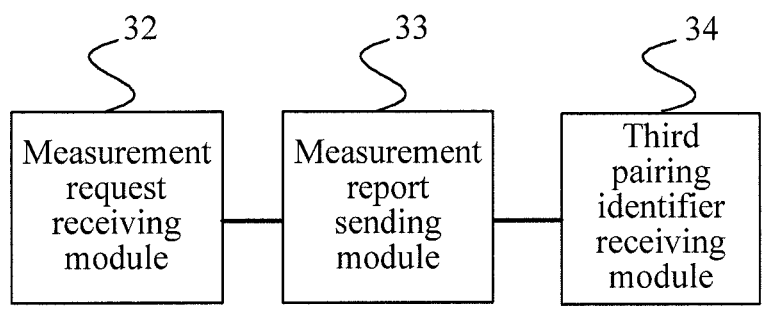
FIG. 23 is a schematic structural diagram of yet another embodiment of a user equipment provided by an embodiment of the present invention.

FIG. 23 is a schematic structural diagram of yet another embodiment of a user equipment provided by an embodiment of the present invention, and as shown in FIG. 23, the user equipment includes a measurement request receiving module 32, configured to receive a measurement request message that carries a first pairing identifier of a beneficial user equipment and is sent by a radio access network device; a measurement report sending module 33, connected to the measurement request receiving module 32, and configured to, after implementing measurement, send a measurement report message, where the measurement report message carries the first pairing identifier; and a third pairing identifier receiving module 34, connected to the measurement report sending module 33, and configured to receive a pairing permission indication message that carries a second pairing identifier and is sent by a network side device, where the second pairing identifier is allocated by the network side to a candidate support user equipment. In Embodiment 7, the radio access network device implements pairing with the support user equipment by sending the measurement request message carrying the first pairing identifier of the beneficial user equipment.

For the functions of the functional modules in the user equipment provided by the embodiment of the present invention, reference may be made to the foregoing method embodiments, and details are not repeatedly described herein.

In the technical solutions provided by the embodiments of the present invention, user pairing in cooperative communication is implemented. Specifically, a smart phone basically can support both a short-distance communications technology (for example, WiFi or BlueTooth) and a cellular communications technology (for example, LTE, 3G UMTS or CDMA, 2G GSM, or WiMAX). Taking an example that the cellular technology is SAE/LTE and the short-distance communications technology is WiFi, in a scenario of cooperative communication between multiple users on a single network node, which is also referred to as a multiple UEs cooperative communication (multiple UEs cooperative communication, MUCC for short) scenario, when at least two UEs are characterized in supporting both WiFi and LTE, to increase the reliability and throughput, the at least two UEs may establish a MUCC relationship, that is, when one of the at least two UEs needs to send or receive data, another UE other than the one UE may provide support to assist communication of the UE. In the present invention, the UE is named beneficial UE and may also be name served UE, target UE or assisted UE, while the another UE is named support UE and may also be named serving UE or assisting UE; the naming of the UEs is only an example made in the present invention, and the naming of the UEs in the present invention includes, but is not limited to, the foregoing naming example.

Taking the support UE and the beneficial UE as an example, the beneficial UE is a final sender of uplink data or a final receiver of downlink data (from a perspective of the cellular technology). For a certain bearer, there is generally only one beneficial UE, and the support UE is a UE used for assisting the beneficial UE to implement data relay. For a certain bearer of the beneficial UE, there may be multiple support UEs.

Taking the support UE and the beneficial UE as an example, the concepts of the beneficial UE and the support UE are defined from the perspective of a bearer of the beneficial UE, for example, UE1 and UE2 form MUCC and may implement cooperative communication with each other; in this way, from the perspective of a certain bearer of UE1, UE2 may support the bearer of UE1, so UE1 is a beneficial UE and UE2 is a support UE. Meanwhile, UE1 may also support a certain bearer of UE2, and from the perspective of the bearer of UE2, UE2 is a beneficial UE and UE1 is a support UE.

Taking the support UE and the beneficial UE as an example, when the UEs are in the same short-distance connection range, the network may send downlink data to the support UE and the beneficial UE, respectively (an optimization method is that, in network scheduling, a UE with the best radio link condition is always selected for data transmission), and when the network sends the downlink data to the support UE, the support UE receives the data and sends the data through short-distance communication (for example, WiFi) to the beneficial UE. Definitely, the data may also be directly sent to the beneficial UE, and the beneficial UE combines the data. Similarly, uplink data of the beneficial UE may also be sent to the network through the beneficial UE or another support UE, and the network combines the data and implements cooperative communication between the UEs.

Through assisted transmission of the support UE, the communication reliability and throughput of the beneficial UE may be increased.

Finally, it should be noted that the foregoing embodiments are merely intended for describing the technical solutions of the present invention, other than limiting the present invention. Although the present invention is described in detail with reference to the foregoing embodiments, a person of ordinary skill in the art should understand that modifications can still be made to the technical solutions described in the foregoing embodiments, or equivalent replacements can still be made to some or all the technical features of the technical solutions described in the foregoing embodiments, without departing from the spirit and scope of the technical solutions of the embodiments of the present invention.

What is claimed is:

1. A user equipment pairing processing method, comprising:
    sending, by a radio access network device, a pairing request message to a core network device, wherein the pairing request message carries pairing request information of a beneficial user equipment and the candidate support user equipment, the pairing request information comprises an identifier of the beneficial user equipment and an identifier of the candidate support user equipment, or the pairing request information comprises an identifier of the beneficial user equipment, an identifier of the candidate support user equipment, and a common pairing identifier; and
    receiving, by the radio access network device, pairing permission indication information from the core network device, about pairing of the beneficial user equipment and the candidate support user equipment.

2. The user equipment pairing processing method according to claim 1, wherein before the sending, by the radio access network device, the pairing request message to the core network device, the method further comprises:
    receiving, by the radio access network device, another pairing request message from the beneficial user equipment, and a pairing success request message from the candidate support user equipment; and
    acquiring, by the radio access network device according to the pairing request message and the pairing success request message, the pairing request information of the beneficial user equipment and the candidate support user equipment.

3. The user equipment pairing processing method according to claim 2, wherein before the receiving the pairing success request message from the candidate support user equipment, the method further comprises:
    acquiring, by the radio access network device, a first pairing identifier of the beneficial user equipment after confirming permission of pairing of the beneficial user equipment according to the identifier of the beneficial user equipment, and sending, by the radio access network device, to the beneficial user equipment, the pairing success request message carrying the first pairing identifier of the beneficial user equipment.

4. The user equipment pairing processing method according to claim 1, wherein before the sending, by the radio access network device, a pairing request message to the core network device, the method further comprises:

receiving, by the radio access network device, another pairing request message from the beneficial user equipment, wherein the another pairing request message carries geographic location information of the beneficial user equipment, and receiving, by the radio access network device, a measurement report message from a user equipment near the geographic location information of the beneficial user equipment, acquiring, by the radio access network device, the identifier of the beneficial user equipment according to the another pairing request message, and acquiring, by the radio access network device, the identifier of the candidate support user equipment according to the measurement report message.

5. The user equipment pairing processing method according to claim 4, wherein before the receiving, by the radio access network device, the measurement report message from the user equipment near the geographic location information of the beneficial user equipment, the method further comprises:

acquiring, by the radio access network device, a first pairing identifier of the beneficial user equipment, and sending, by the radio access network device, to the user equipment near the geographic location information of the beneficial user equipment, a measurement request message carrying the first pairing identifier.

6. A radio access network device, comprising: a processor, a transmitter coupled to the processor and a receiver coupled to the processor; wherein the transmitter is configured to send a pairing request message to a core network device, wherein the pairing request message carries pairing request information of a beneficial user equipment and the candidate support user equipment, the pairing request information comprises an identifier of the beneficial user equipment and an identifier of the candidate support user equipment, or the pairing request information comprises an identifier of the beneficial user equipment, an identifier of the candidate support user equipment, and a common pairing identifier; and the receiver is configured to receive pairing permission indication information from the core network device, about pairing of the beneficial user equipment and the candidate support user equipment.

7. The radio access network device according to claim 6, wherein the receiver is configured to receive another pairing request message from the beneficial user equipment, and a pairing success request message from the candidate support user equipment before the transmitter sends the pairing request message to the core network device; and the processor is configured to acquire according to the pairing request message and the pairing success request message, the pairing request information of the beneficial user equipment and the candidate support user equipment.

8. The radio access network device according to claim 7, wherein the processor is configured to acquire a first pairing identifier of the beneficial user equipment after confirming permission of pairing of the beneficial user equipment according to the identifier of the beneficial user equipment before the receiver receives the pairing success request message from the candidate support user equipment, and the transmitter is configured to send to the beneficial user equipment, the pairing success request message carrying the first pairing identifier of the beneficial user equipment.

9. The radio access network device according to claim 6, wherein the receiver is configured to, before the transmitter sends the pairing request message to the core network device, receive another pairing request message from the beneficial user equipment wherein the another pairing request message carries geographic location information of the beneficial user equipment, and a measurement report message from a user equipment near the geographic location information of the beneficial user equipment;

the processor is configured to acquire the identifier of the beneficial user equipment according to the another pairing request message, and the identifier of the candidate support user equipment according to the measurement report message.

10. The radio access network device according to claim 9, wherein the processor is configured to acquire a first pairing identifier of the beneficial user equipment before the receiver receives the measurement report message from the user equipment near the geographic location information of the beneficial user equipment, and the transmitter is configured to send to the user equipment near the geographic location information of the beneficial user equipment, a measurement request message carrying the first pairing identifier.

* * * * *